United States Patent
Funamoto et al.

(10) Patent No.: US 6,774,964 B2
(45) Date of Patent: Aug. 10, 2004

(54) REFLECTION TYPE DISPLAY APPARATUS, REFLECTION TYPE DISPLAY APPARATUS MANUFACTURING METHOD, AND ELECTRONIC APPLIANCE USING THE SAME

(75) Inventors: Akihiro Funamoto, Kyoto (JP); Motohiko Matsushita, Kyoto (JP); Masayuki Shinohara, Kyoto (JP); Masaaki Ikeda, Kyoto (JP); Shigeru Aoyama, Kyoto (JP)

(73) Assignee: Omron Corporation, Kyoto (JP)

( * ) Notice: Subject to any disclaimer, the term of this patent is extended or adjusted under 35 U.S.C. 154(b) by 54 days.

(21) Appl. No.: 10/035,032

(22) Filed: Dec. 27, 2001

(65) Prior Publication Data

US 2002/0085150 A1 Jul. 4, 2002

(30) Foreign Application Priority Data

Dec. 28, 2000 (JP) .................................... 2000-402942
Apr. 13, 2001 (JP) .................................... 2001-115154

(51) Int. Cl.$^7$ .......................................... G02F 1/1335
(52) U.S. Cl. ...................................... 349/113; 349/63
(58) Field of Search .......................... 349/113–142, 67, 349/61, 62, 63

(56) References Cited

U.S. PATENT DOCUMENTS 5,841,496 A * 11/1998 Itoh et al.
6,233,031 B1 * 5/2001 Ishitaka ....................... 349/113
6,538,711 B2 * 3/2003 Funahata et al. ........... 349/113

OTHER PUBLICATIONS

Patent Abstracts of Japan, Publication No. 10–268306, Publication date Oct. 9, 1998, 3 pages.
Patent Abstracts of Japan, Publication No. 11–202785, Publication date Jul. 30, 1999, 2 pages.

* cited by examiner

Primary Examiner—Dung T. Nguyen
Assistant Examiner—Thoi V. Duong
(74) Attorney, Agent, or Firm—Osha & May L.L.P.

(57) ABSTRACT

In a reflection type display apparatus in which a forward lightening apparatus is arranged in front of a reflection type display panel, lowering of contrast occurred when the forward lightening apparatus is turned ON is prevented. In this reflection type display apparatus, the forward lightening apparatus is adhered via an adhesive layer to a front surface of the reflection type display panel having a reflection plane. The reflection plane is constituted by a large number of first very fine patterns having a spherical shape, and a large number of second very fine patterns whose front surfaces are inclined. External light which is vertically entered into the front surfaces is reflected by the first patterns, and thereafter, the reflected external light is projected as a display along a forward direction. The forward lightening apparatus is arranged by providing a light source on a side surface of a light conducting plate having a wedge shape. The light is obliquely projected from a rear surface of the light conducting plate to the reflection type display panel. The light which is obliquely projected from the forward lightening apparatus to the reflection type display panel is reflected by the second patterns, and thereafter, is projected along the substantially same directions as reflection light of the external light.

21 Claims, 32 Drawing Sheets

LIGHT CONDUCTING ANGLE DISTRIBUTION OF POINT P1

REFLECTION TYPE DISPLAY APPARATUS, REFLECTION TYPE DISPLAY APPARATUS MANUFACTURING METHOD, AND ELECTRONIC APPLIANCE USING THE SAME

BACKGROUND OF THE INVENTION

1. Field of the Invention

The present invention is related to a reflection type display apparatus for displaying characters and the like by reflecting light entered from a front surface thereof and then controlling this reflection light by every pixel, and also related to a method of manufacturing such a reflection type display apparatus, and an electronic appliance using this reflection type display apparatus.

2. Description of the Related Art

Display apparatus such as liquid crystal display apparatus are mainly subdivided into transmission type display apparatus and reflection type display apparatus. As to a transmission type liquid crystal display apparatus, since a liquid crystal display panel is illuminated by a back light mounted on a rear surface thereof, a display screen becomes bright. However, since the back light must be continuously turned ON while the transmission type liquid crystal display apparatus is used, high power consumption thereof is required. As a result, reflection type liquid crystal display apparatus are preferably employed in portable appliances using batteries, for example, portable telephones.

In a reflection type liquid display apparatus, while a reflection plane is provided on a rear surface of a liquid crystal layer, since a display screen of this reflection type liquid crystal apparatus is illuminated, or lightened in such a manner that external light (namely, light such as directly-entered sunlight and lightening light, which is entered from peripheral portion) which is entered into the display screen of this display apparatus is reflected on the reflection plane under bright peripheral environment, power consumption thereof may be suppressed. Such reflection type liquid crystal display apparatus are further subdivided into a semi-transmission type liquid crystal display apparatus and a full (total) reflection type liquid crystal display apparatus.

A semi-transmission type reflection-mode liquid crystal display apparatus is arranged in such a manner that a large number of very small windows are opened in a reflection plane, and a back light is arranged behind the reflection plane. When the back light is turned ON, since a display screen is lightened by light of the back light, which has passed through very small windows (through holes), a display content of this semi-transmission type reflection-mode liquid crystal display apparatus may be recognized even in a dark place. However, since a large number of windows are opened in the reflection plane in such a semi-transmission type reflection mode liquid crystal display apparatus, an optical reflection efficiency (reflectance factor) at this reflection plane is lowered. As a result, when the semi-transmission type reflection-mode liquid crystal display apparatus is used under external light, there is such a problem that the display screen becomes dark.

In contrast to the above-described semi-transmission type reflection-mode liquid crystal display apparatus, a full reflection type liquid crystal display apparatus is arranged as follows. That is, while a forward lightening (illumination) apparatus is provided on a front surface of a liquid crystal display panel, a display screen of this liquid crystal display panel may be lightened by the forward lightening apparatus from the front surface under such a condition that a peripheral area around this full reflection type liquid crystal display apparatus becomes dark and thus, a display content of the display screen can be hardly observed. As a consequence, since such a large number of windows formed in the semi-transmission type liquid crystal display apparatus are no longer formed in a reflection plane of this full reflection type liquid crystal display apparatus, a light reflection efficiency at this reflection plane is not lowered. Even in such a case that the display screen of this full reflection-type liquid crystal display apparatus is illuminated by external light, the bright display screen may be obtained. In particular, this full reflection type liquid crystal display apparatus may be strongly expected to be employed in portable electronic appliances.

FIG. 1 is a sectional view for schematically indicating a structure of one conventional full (total) reflection type liquid crystal display apparatus 1. This full reflection type liquid crystal display apparatus 1 is arranged in such a manner that a forward lightening apparatus 3 is positioned on a front surface of a reflection type liquid crystal display panel 2. This reflection type liquid crystal display panel 2 is constituted by that a liquid crystal material 7 is sandwiched to be sealed between a board 4 and a glass board 6. A reflection plane 5 is formed on a surface of this board 4. In this liquid crystal display panel 2, such a constructual means is provided with each of pixels, by which incident light of this reflection type liquid crystal panel 2 may be reflected by the reflection plane 5 so as to be projected to a forward direction, and incident light may be absorbed not to be projected to the forward direction. The forward lightening apparatus 3 is constructed in such a manner that a light source unit 9 constituted by a cold cathode tube and the like is provided on a side surface of a transparent light conducting plate 8. It should be understood that light is represented by an arrow in this drawing, and will be similarly denoted in other drawings.

Thus, in accordance with such a full reflection type liquid crystal display apparatus 1, the forward lightening apparatus 3 is turned OFF in the case that a peripheral area of this full reflection type liquid crystal display apparatus 1 becomes bright. At this time, such external light is reflected on the reflection plane 5, and thereafter, this reflected external light is projected from the front surface of the full reflection type liquid crystal display apparatus 1, and then, this projected light is entered into eyes of a viewer. The external light corresponds to directly-entered sunlight, illumination (lightening) light, and the like, which pass through the forward lightening apparatus 3 and then, are entered into the liquid crystal display panel 2. On the other hand, when a peripheral area of this full reflection type liquid crystal display apparatus 1 becomes dark, the forward lightening apparatus 3 is turned ON. At this time, light projected from the light source unit 9 is entered from a side surface of the light conducting plate 8 into an internal portion of this light conducting plate 8. Then, while this entered light is fully-reflected between the front surface and the rear surface of the light conducting plate 8 in a repetition manner, this light is propagated within the light conducting plate 8. While the light is propagated inside the light conducting plate 8 in a half way, the propagation path of this light is bent by an optical pattern 10 which is provided on this light conducting plate 8. Then, such light which is entered into the rear surface of the light conducting plate 8 at a smaller incident angle then a critical angle of a total reflection of this light conducting plate 8 is projected from this rear surface of the light conducting plate 8 and then, is entered into the liquid crystal display panel 2. After this incident light is reflected from the reflection plane 5, the reflected light is projected from the front surface of the full reflection type liquid crystal display apparatus 1, and then, is entered into the eyes of the viewer.

While a concave/convex-shaped diffusion pattern is formed on the reflection plane 5, a directivity angle of reflection light may be expanded by this diffusion pattern, so that a visible range of a displayed image may be widened. Also, considering use conditions of such a full reflection type liquid crystal display apparatus 1, since there are many cases that both the external light and the viewers are positioned along a direction substantially perpendicular to the full reflection type liquid crystal display apparatus 1, the reflection characteristic of the reflection plane 5 is set in such a manner that the external light is diffused along such a direction approximated to a total reflection.

Also, both in the case that the display screen is viewed by using the external light and in the case that the display screen is viewed by turning ON the forward lightening apparatus 3, it is required that this display screen can be observed from the same direction. As a consequence, the forward projection light when the external light is used should be located substantially parallel to the forward projection light when the forward lightening apparatus 3 is employed. Moreover, in the conventional full reflection type liquid crystal display apparatus 1, since both the external light and the lightening light derived from the forward lightening apparatus 3 are reflected from the reflection planes having the common reflection characteristic (having same diffusion patterns) to the side of the viewer positioned forwardly, the lightening light of the forward lightening apparatus 3 is required to be entered into either the reflection plane or the liquid crystal display panel 2 from the same direction as that of the external light. As a consequence, the lightening light derived from the forward lightening apparatus 3 must be also projected along such a direction substantially perpendicular to the front surface of this full reflection type liquid crystal display apparatus 1. To this end, in the conventional forward lightening apparatus 3, while the very fine optical pattern 10 having the wedge shape is formed on the front surface of the light conducting plate 8, since the lightening light is totally reflected by this optical pattern 10, the light which is propagated through the light conducting plate 8 is converted into the light along the direction substantially perpendicular to the reflection plane 5. Then, after this light is matched to the direction which is located substantially parallel to the incident direction of the external light, the resultant light is projected from the rear surface to the liquid crystal display panel 2.

In the conventional liquid crystal display apparatus 1 with employment of the forward lightening apparatus 3, an air layer 11 is present between the forward lightening apparatus 3 and the liquid crystal panel 2. As indicated in FIG. 2, light which is projected from the rear surface of the forward lightening apparatus 3 is reflected on a boundary plane between this air layer 11 and the forward lightening apparatus 3, and also on another boundary plane between this air layer 11 and the liquid crystal display panel 2. Since this reflected light corresponds to such light which may not contribute the display operation of the liquid crystal display apparatus 1, this reflected light will be referred to as "invalid light" hereinafter. On the other hand, as explained in above, since the lighting light of the forward lightening apparatus 3 is entered from the direction perpendicular to the liquid crystal display panel 2 into the inside of this liquid crystal display panel 2, both the invalid light reflected on the boundary plane between the air layer 11 and the forward lightening apparatus 3, and the invalid light reflected on the boundary plane between the air layer 11 and the liquid crystal display panel 2 are projected along a direction substantially equal to the direction of the display-purpose light (namely, "valid light" for display operation) which is reflected on the reflection plane 5. As a consequence, both the display-purpose light and the invalid light are entered into the eyes of the viewer. Accordingly, there is such a problem that contrast of the display screen is lowered.

Also, the optical pattern 10 is provided on the front surface of the forward lightening apparatus 3. Moreover, since this optical pattern 10 is made in contact with air and therefore a difference in refractive indexes of the boundary planes is large, as indicated in FIG. 3, such light which is entered into a region 12 whose gradient is sharp (namely, stepped portion of boundary planes of optical pattern 10) may be totally reflected, may be largely refracted, and thus, may be readily scattered on a large area of the sharp gradient region 12 among such light which has been reflected on the reflection plane 5, and thereafter, is again entered into the internal portion of the forward lightening apparatus 3, and then, is projected from the front surface of the forward lightening apparatus 3. As a result, the transparent characteristic of the forward lightening apparatus 3 would be lowered (in other words, this condition is equivalent to such condition that diffusion plate is installed on surface of reflection type liquid crystal display apparatus).

SUMMARY OF THE INVENTION

The present invention has been made to solve the above-explained problems, and therefore, has an object to provide such a reflection type display apparatus in which a forward lightening apparatus is installed on a front surface of a reflection type display panel, while lowering of contrast of this reflection type display apparatus when the forward lightening apparatus is turned ON is avoided.

Another object of the present invention is to provide another reflection type display apparatus in which a forward lightening apparatus is installed on a front surface of a reflection type display panel, while diffusion of light caused by the forward lightening apparatus is suppressed and a transparent characteristic of the forward lightening apparatus is improved.

A further object of the present invention is to provide a method capable of manufacturing the above-described reflection type display apparatus, and also, to provide such an electronic appliance with employment of the above-explained reflection type display apparatus.

To achieve the above-described objects, a reflection type display apparatus, according to an aspect of the present invention, is featured by such a reflection type display apparatus comprising: a reflection type display panel having a reflection plane used to reflect thereon light entered from a forward direction; and a forward lightening apparatus arranged in front of the reflection type display panel; wherein: light which is entered from the forward lightening apparatus into the reflection type display panel is entered into the reflection type display panel along a direction different from a direction of external light entered into the reflection type display panel; and both the light which is derived from the forward lightening apparatus and is reflected on the reflection plane, and the external light which is reflected on the reflection plane are projected along the substantially same reflection direction.

In this case, as the reflection type display panel, a so-called "liquid crystal display panel" is typically known, but the present invention is not limited thereto. This liquid crystal display panel produces an image by utilizing a characteristic of liquid crystal, while the liquid crystal is sealed inside the liquid crystal display panel. Also, the external light implies such light which is entered from a peripheral portion such as direct sun light and illumination light except for the illumination light of the forward lightening apparatus. Normally, since a display screen is expected to be observed from a front surface thereof, external light is entered into the front surface of the reflection type display apparatus along a substantially vertical direction, and another external light reflected on the reflection plane is also projected along a direction perpendicular to the front surface. As a consequence, in such a case, the incident light of the forward lightening apparatus is obliquely entered with respect to the front surface of the reflection type display panel. However, the incident direction of the external light is not limited to the above-described incident direction. For example, the external light may be obliquely entered from the front surface of the reflection type display panel. Also, the direction for reflecting the external light may be made different from the regular reflection direction of the external light on the surface of each of the reflection type display panels in accordance with the following manner. That is, concave/convex patterns used to reflect the entered external light are made in an asymmetrical shape, the direction for reflecting the incident light derived from the forward lightening apparatus may be made different by adjusting the inclined planes of the concave/convex patterns used to reflect the incident light derived from the forward lightening apparatus. As a result, it is possible to avoid that the image can be hardly observed due to such light which is regularly reflected on the surface of the reflection type display panel.

In the reflection type display apparatus according to the present invention, both the light derived from the forward lightening apparatus, which is reflected on the reflection plane, and the external light which is reflected on the reflection plane are projected along the substantially same reflection directions. As a result, there is no change in the directions along which the display screen can be observed when the display screen is illuminated by employing the forward lightening apparatus and also when the display screen is illuminated by the external light without employing the forward lightening apparatus. Thus, easy operations of this reflection type display apparatus can be maintained. Moreover, in this reflection type display apparatus, since the light which is entered from the forward lightening apparatus into the reflection type display panel is entered into this reflection type display panel from such a direction different from the direction along which the external light is entered into the reflection type display panel, even when the light projected from the forward lightening apparatus is reflected on the surfaces, or the internal portions of the forward lightening apparatus and the reflection type display panel to become such invalid light which never contributes the display operation, this invalid light is not reflected along the same direction as that of the reflection light for the display purpose. As a consequence, in accordance with the reflection type display apparatus of the present invention, it is possible to avoid such a phenomenon that the contrast of the display screen is lowered by the reflection light of the forward lightening apparatus, so that the display screen can be easily observed.

The above-described reflection plane employed in an embodiment of the present invention, is subdivided into both a first region capable of reflecting thereon light which is obliquely entered from the forward lightening apparatus along the reflection direction, and a second region capable of reflecting thereon external light which is entered at a substantially right angle along the reflection direction. As a consequence, such reflection light which is entered along the different direction as that of the external light and is reflected from the reflection plane of the forward lightening apparatus can be projected along the substantially same reflection direction as that of the external light which is reflected on the reflection plane. Also, the second region may be arranged in such a manner that the second region is separated from the reflection plane of the reflection type display panel, and is arranged on a rear surface of the forward lightening apparatus constituted by a light source and a light conducting plate.

Also, the above-described reflection plane, according to another embodiment of the present invention, is featured by comprising: a first region on which a concave/convex pattern is formed, the concave/convex pattern reflecting thereon light which is obliquely entered from the forward lightening apparatus along the reflection direction; and a second region on which another concave/convex pattern is formed, the concave/convex pattern reflecting thereon external light which is entered at a substantially right angle along the reflection direction. As a consequence, such reflection light which is entered along the different direction as that of the external light and is reflected from the reflection plane of the forward lightening apparatus can be projected along the substantially same reflection direction as that of the external light which is reflected on the reflection plane.

Further, in another embodiment of the present invention in which the first region and the second region own the concave/convex patterns, a normal line stood on an averaged inclined surface of the concave/convex patterns formed on the first region is inclined from a direction perpendicular to the reflection plane toward a light source direction of the forward lightening apparatus. As a result, the incident light of the forward lightening apparatus which is obliquely entered from the light source side can be reflected along the forward direction. Also, the second region may be arranged in such a manner that the second region is separated from the reflection plane of the reflection type display panel, and is arranged on a rear surface of the forward lightening apparatus constituted by a light source and a light conducting plate.

Also, the above-explained reflection plane, according to another embodiment of the present invention, is featured by having substantially no such a region located in parallel to a front surface of said reflection type display panel. As a result, the external light entered along the forward direction can be hardly and again projected to the forward direction. As a consequence, while reducing such reflection light which is projected forwardly, and also can hardly observe the display content due to the reflections occurred except for the reflection plane, the reflection light of the external light may be reflected to another direction, so that the display screen can become bright.

Also, in accordance with a further embodiment of the present invention, at an arbitrary point on the reflection plane, a shape is modulated in such a manner that a normal line stood on an averaged inclined plane may be directed to a specific region located in front of the reflection plane. Both a reflection light luminance central axis of the entered external light, and a reflection light luminance central axis of the incident light for the forward lightening apparatus can be converged to a specific position located in front of the reflection type display panel. Thus, such an image which can be viewed at this specific position can become bright.

Also, the above-described forward lightening apparatus, according to a further embodiment of the present invention, is featured by comprising: a light source for projecting light; and a light conducting plate for confirming incident light in the own light conducting plate and for propagating the confined light through the own light conducting plate. As a result, such light may be projected from the rear surface of the light conducting plate along an oblique direction, while this light is entered at an angle smaller than a critical angle of a total reflection on the rear surface of the light conducting plate. As a consequence, since such a forward lightening apparatus is employed, the light of the forward lightening apparatus may be entered into the reflection type display panel from a direction different from the incident direction of the external light.

Furthermore, in the above-described embodiment, a thickness of an edge portion of the light conducting plate, which is located far from the light source, is made thinner than a thickness of a portion of the light conducting plate, which is located in the vicinity of the light source. In the light conducting plate having such a tapered shape, since the optical pattern used to project the light confined within the light conducting plate is no longer provided on this light conducting plate, the projected light is not diffused by this light conducting plate, and also the transparent characteristic of the forward lightening apparatus is not lowered.

Also, in such a case that both the front surface and the rear surface of the light conducting plate are made smooth, since the optical pattern used to project the light confined within the light conducting plate is no longer provided on this light conducting plate, the projected light is not diffused by this light conducting plate, and also the transparent characteristic of the forward lightening apparatus is not lowered.

Also, the above-described forward lightening apparatus, according to a further embodiment of the present invention, is featured by comprising a light source for projecting light; and a directivity improving unit for controlling directivity of light projected from said light source. Since the light projected from the light source is controlled by the directivity improving unit, the light may be obliquely entered into the front surface of the reflection type display panel. As a result, even when the light of the forward lightening apparatus is reflected on the front surface of the reflection type display panel, this reflected light is not reflected along the forward direction, but also, lowering of the contrast of the display screen caused by the reflective light can be avoided.

Also, in the reflection type display apparatus according to a further embodiment, a front surface of the light conducting plate is made smooth; and a pattern inclined in such a manner that a thickness of the light conducting plate on the side located far from the light source becomes thin is repeatedly formed on a rear surface of the light conducting plate. As a result, the light confined within the light conducting plate can be substantially uniformly projected along the oblique direction from the rear surface of the light conducting plate by using the inclined pattern. Moreover, since the front surface of the light conducting plate is made smooth and also the inclined pattern can be hardly observed from the front surface, the transparent characteristic of the forward lightening apparatus can be hardly lowered.

Also, in the reflection type display apparatus according to a further embodiment, a rear surface of the light conducting plate is optically adhered to the reflection type display panel; and a low refractive index layer is formed between the light conducting plate and the reflection type display panel, the reflective index of the low refractive index layer being larger than a refractive index of air and smaller than a refractive index of the light conducting plate. As a result, the critical angle of the total reflection occurred on the rear surface of the conducting plate which is made in contact with the low refractive index layer may become larger than the critical angle of the total reflection occurred on the front surface of the light conducting plate which is made in contact with air. As a consequence, such light which is propagated through the light conducting plate is not projected from the front surface of the light conducting plate, but is projected from the rear surface of the light conducting plate to the reflection type display panel, so that the utilization efficiency of such light can be improved.

Also, in the case that the low refractive index layer is provided on the rear surface of the light conducting plate, there are some problems. That is, the light of the forward lightening apparatus is leaked in the vicinity of the light source to constitute loss, and the place locally becomes bright. In such a case, if a thickness of the light conducting plate becomes thin in accordance with a position where the light conducting plate reaches close to the light source within a region close to the light source then it is possible to prevent a leak of light in the vicinity of the light source.

Further, a manufacturing method of a reflection type display apparatus, according to another aspect of the present invention, is featured by such a manufacturing method in which under such a condition that resin supplied onto a board has not yet been hardened, or is softened, the resin is sandwiched between a stamper having an inverted pattern of a reflection plane and the board and then is depressed so as to transfer the inverted pattern of the stamper to the resin. As such a manufacturing method, there are one method for coating unhardened resin on a board and for sandwiching this resin between a stamper and the board. That is, after resin has been coated on a board by way of a spin coating manner, this coated resin is once hardened. Thereafter, this hardened resin is again heated to be softened, and then, this sifted resin is sandwiched between the stamper and the board. In accordance with this method, a predetermined reflection plane can be mass-produced in a high efficiency by way of the stamping method using the stamper. In particular, since the transfer time can be shortened in the latter method, this method may be properly applied to the mass production.

Further, a manufacturing method of a reflection type display apparatus, according to a further aspect of the present invention, is featured by such a manufacturing method in which ultraviolet hardening type resin is supplied onto a board; and under such a condition that the ultraviolet hardening type resin is sandwiched between a stamper having an inverted pattern of a reflection plane and the board, ultraviolet rays are irradiated to the ultraviolet hardening type resin so as to harden the ultraviolet hardening type resin, and then to transfer the inverted pattern of the stamper to the ultraviolet hardening type resin. In accordance with such a method, a predetermined reflection plane can be mass-produced in a high efficiency by way of the stamping method using the stamper. Moreover, the curing time after molding is no longer required by employing the ultraviolet hardening resin, the reflection plane can be formed in a higher efficiency.

Also, in the case that the reflection type display apparatus of the present invention is employed in a portable electronic appliance such as a portable telephone, a portable information terminal, a portable type computer (notebook type computer etc.), and a television, this reflection type display apparatus may be used as such a display unit capable of reducing power consumption, and capable of increasing contrast of a display screen thereof.

Furthermore, a light reflecting method, according to a still further aspect of the present invention, is featured by that in such a light reflecting method of a reflection type display apparatus equipped with a reflection type display panel having a reflection plane used to reflect thereon light entered from a forward direction, and a forward lightening apparatus arranged in front of the reflection type display panel, the light reflecting method is comprised of: a step for entering light which is entered from the forward lightening apparatus into the reflection type display panel into the reflection type display panel along a direction different from a direction of external light entered into the reflection type display panel; and a step for projecting both the light which is derived from the forward lightening apparatus and is reflected on the reflection plane, and the external light which is reflected on the reflection plane along the substantially same reflection direction.

It should be understood that the above-described structural elements of the present invention may be combined with each other, as being permitted as possible.

BRIEF DESCRIPTION OF THE DRAWINGS

For a better understanding of the present invention, reference is made of a detailed description in conjunction with the accompanying drawings, in which.

DETAILED DESCRIPTION OF THE PREFERRED EMBODIMENTS

First Embodiment Mode

Figure 1:
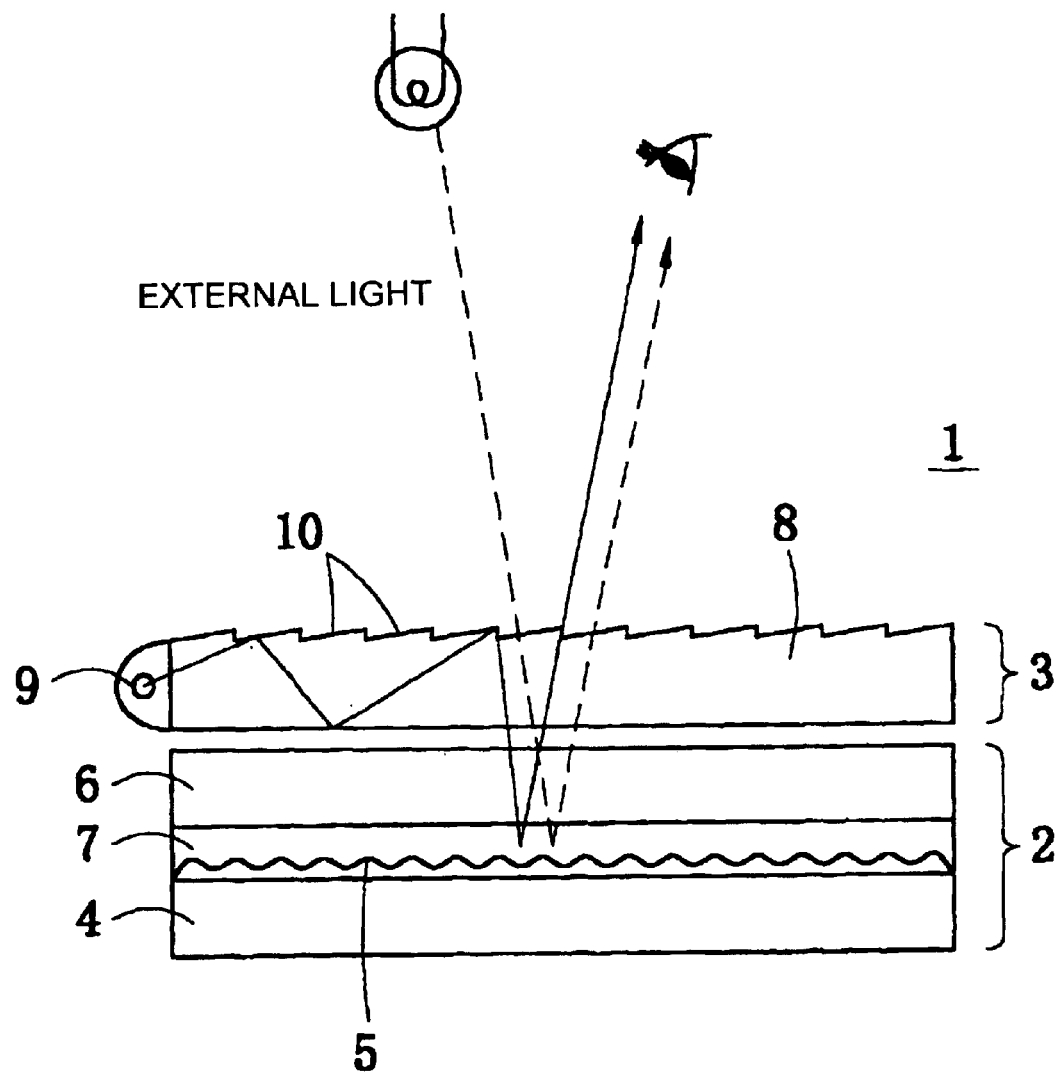
FIG. 1 is a sectional diagram for schematically showing the conventional full reflection type liquid crystal display apparatus.
Figure 2:
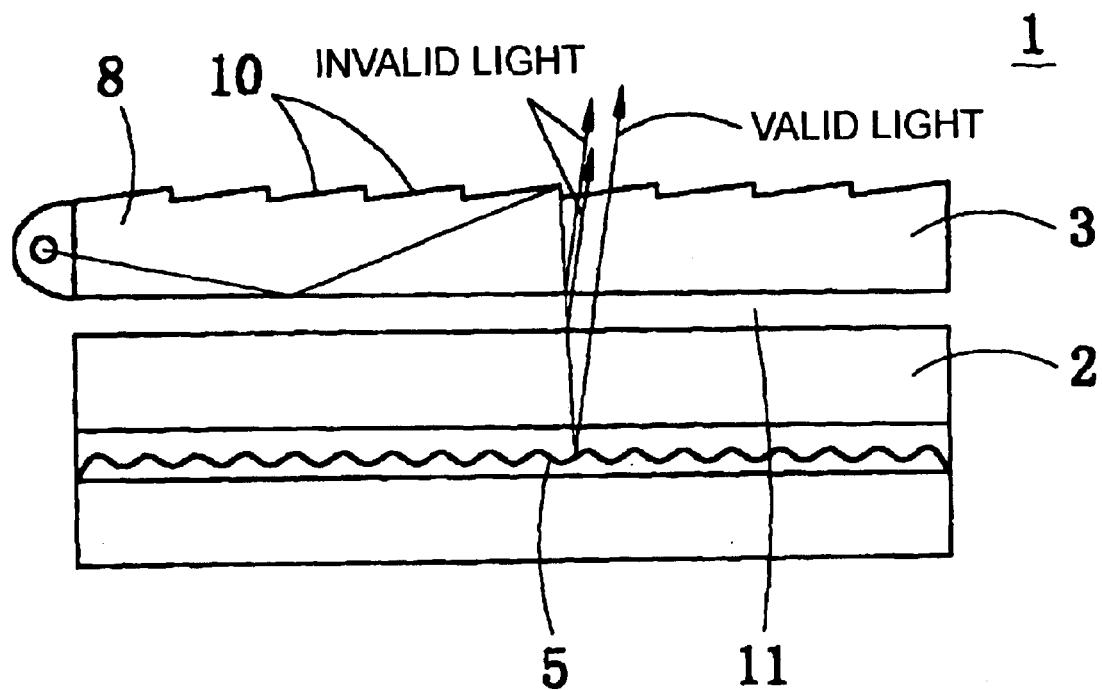
FIG. 2 is an explanatory diagram for explaining the reason why the contrast of the display screen is lowered in the full reflection type liquid crystal display apparatus of FIG. 1.
Figure 3:
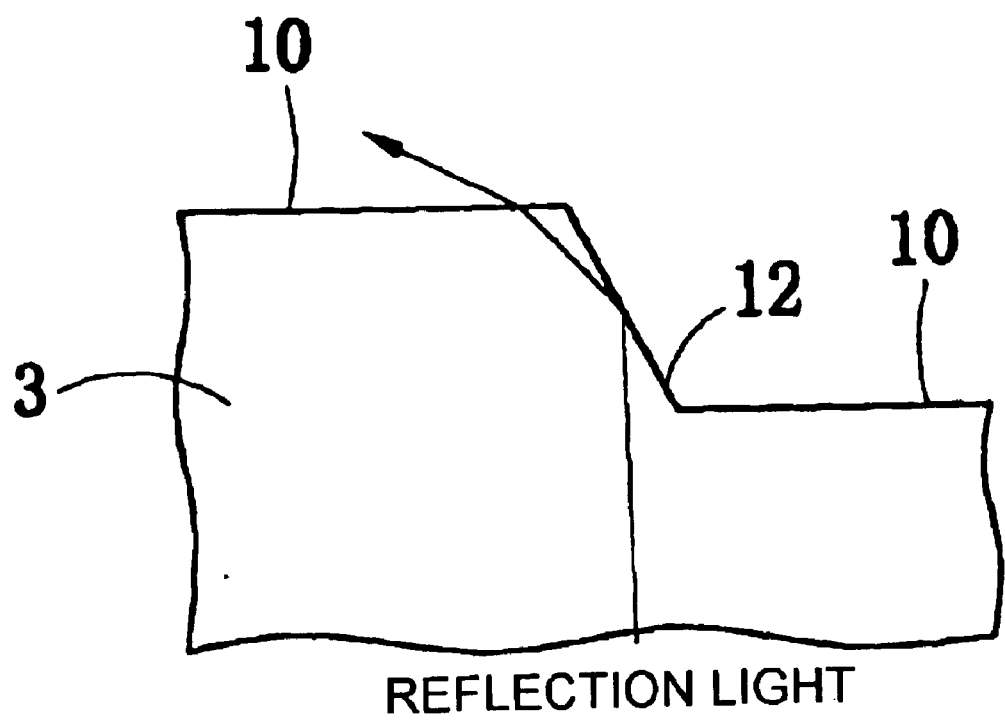
FIG. 3 is an explanatory diagram for explaining the reason why the transparent characteristic of the display screen is lowered in the full reflection type liquid crystal display apparatus of FIG. 1.
Figure 4:
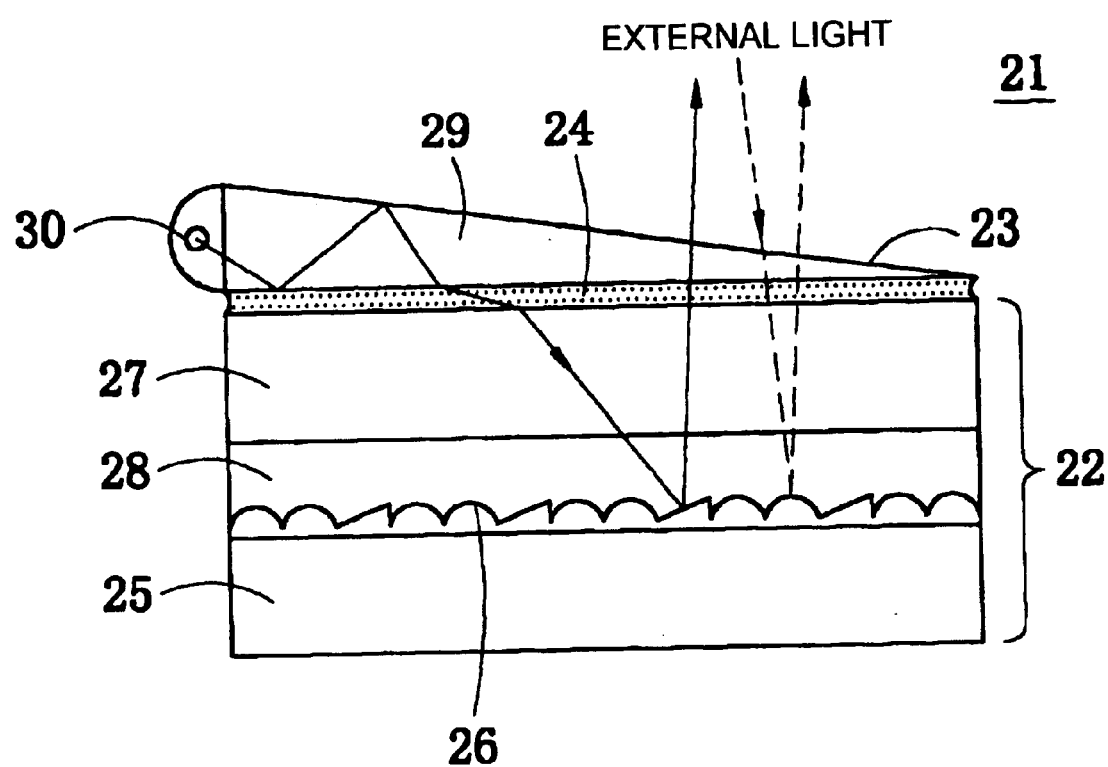
FIG. 4 is a sectional view for schematically indicating a structure of a reflection type display apparatus according to a first embodiment mode of the present invention.

FIG. 4 is a diagram for indicating a structure of a reflection type display apparatus 21 according to a first embodiment mode of the present invention. This reflection type display apparatus 21 is arranged in such a manner that a forward lightning apparatus 23 is adhered via an adhesive layer 24 made of an optical-purpose transparent resin to a front surface of a reflection type display panel 22. The reflection type display panel 22 is constituted by that while a board 25 is located opposite to a transparent board 27 such as a glass board, a functional material 28 such as a liquid crystal material is sealed between both the board 25 and the transparent board 27. A reflection plane 26 is formed on a front surface of this board 25. The reflection type display panel 22 corresponds to, for example, the liquid crystal display panel as explained in the prior art, but is not limited to such a liquid crystal display panel.

Figure 5:
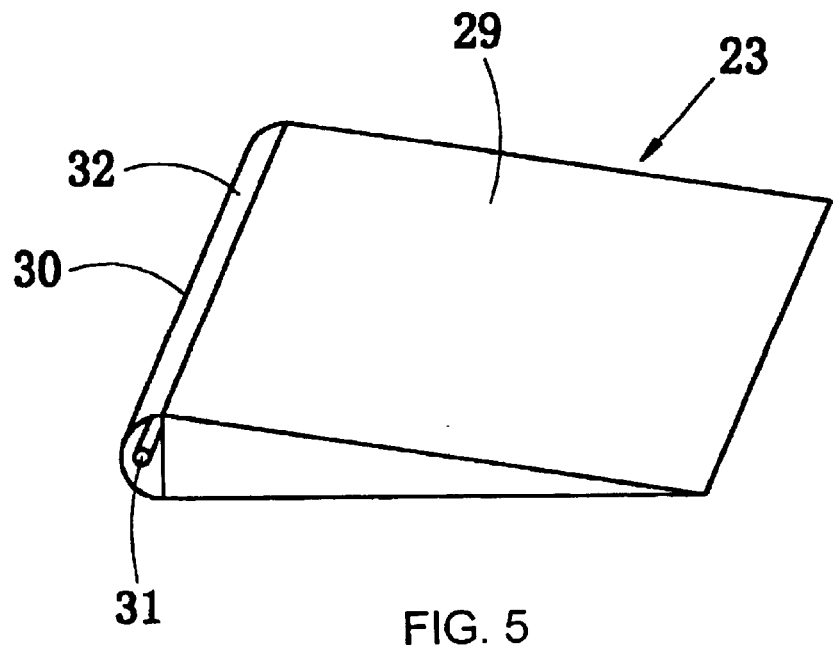
FIG. 5 is a perspective view of showing a forward lightening apparatus employed in the reflection type display apparatus of FIG. 4.

The forward lightening apparatus 23 is constructed of a light conducting plate 29 and a light source unit 30. The light conducting plate 29 is molded by employing a transparent material having a high refractive index such as methacrylic resin and polycarbonate resin. As indicated in FIG. 5, this light conducting plate 29 is formed in a wedge shape in such a manner that a thickness of one edge portion thereof is made thinner, and also a thickness of the other edge portion thereof is made thicker. Both a front surface and a rear surface of the light conducting plate 29 constitute smooth surfaces having no pattern. The light source unit 30 is arranged in such a manner that this light source portion 30 is located opposite to such a side surface having a thick thickness of the light conducting plate 29 along this thick side surface. This light source unit 30 is arranged by an elongated light source (line-shaped light source) 31 such as a cold cathode tube, and a shade 32 used to reflect light thereon.

The forward lightening apparatus 23 is optically adhered to the front surface of the reflection type display panel 22 by an adhesive layer 24 in such a manner that a rear surface of this forward lightening apparatus 23 is positioned in parallel to the reflection type display panel 22. This adhesive layer 24 owns such a refractive index which is smaller than that of the light conducting plate 29, and also, larger than that of air.

Figure 6:
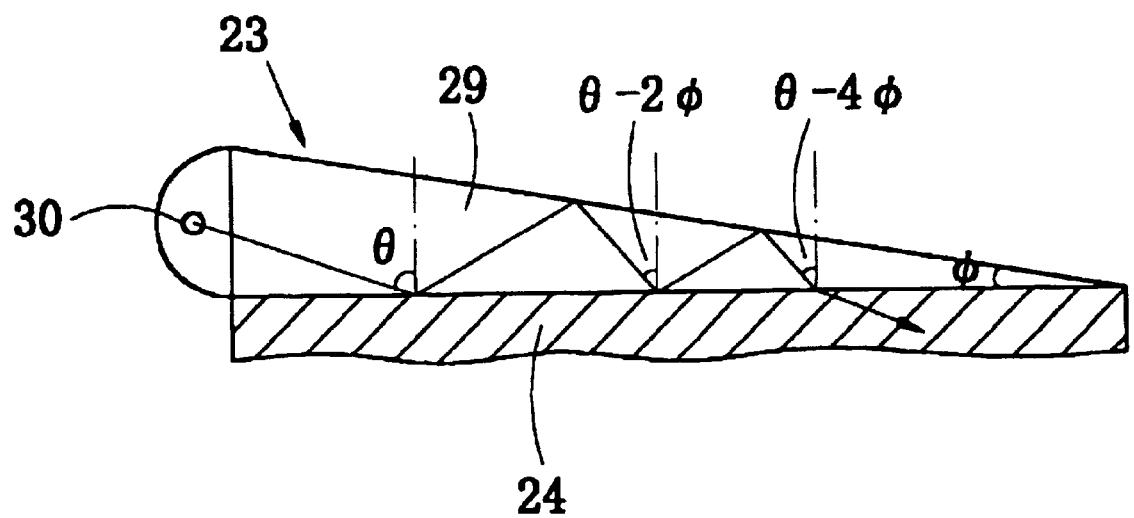
FIG. 6 is a diagram for illustratively showing behavior of light propagated within a light conducting plate of the forward lightening apparatus represented in FIG. 5.

As a result, in this forward lightening apparatus 23, light projected (emitted) from the light source unit 30 is entered from an edge surface of the light conducting plate 29 into an inside of this light conducting plate 29. Then, while this entered light is totally reflected between the front surface and the rear surface of the light conducting plate 29 in a repeated manner, this reflected light is propagated from the thicker thickness side thereof to the thinner thickness side thereof. Since the thickness of the light conducting plate 29 on the side where the light source unit 30 is provided becomes thick, every time the incident light is totally reflected between the front surface and the rear surface of the light conducting plate 29, incident angles with respect to both the front surface and the rear surface become small. In other words, as shown in FIG. 6, assuming now that an angle of a tip portion of the light conducting plate 29 is equal to "φ", every time the incident light is totally reflected on the rear surface of the light conducting plate 29 and then is again entered into the rear surface of the light conducting plate 29, the incident angle of the light is decreased every "2φ." Then, when the incident angle of the light which is totally reflected between the front surface and the rear surface and is again entered into the rear surface of the light conducting plate 29 becomes smaller than a critical angle of a total reflection on the rear surface of the light conducting plate 29, this light may be projected from the rear surface of the light conducting plate 29 toward an oblique direction (for example, direction along which projection angle larger than, or equal to 45 degrees).

Figure 7:
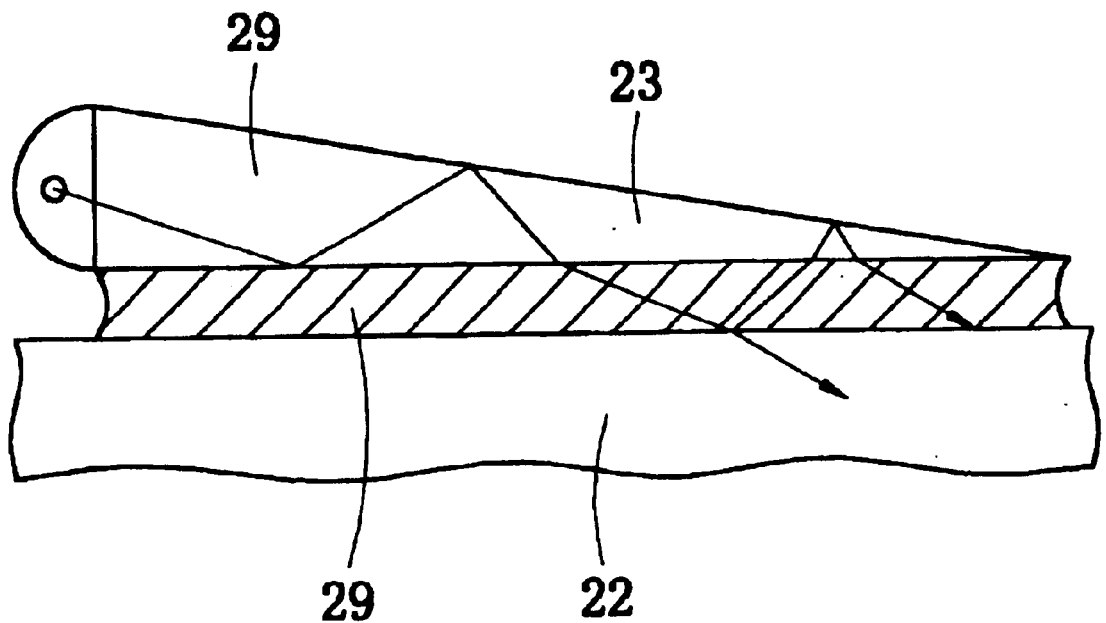
FIG. 7 is a diagram for illustratively indicating another behavior of light propagated within the light conducting plate of the forward lightening apparatus shown in FIG. 5.

Also, since the refractive index of the adhesive layer 24 is smaller than the refractive index of the light conducting plate 29 and also larger than the refractive index of air, a critical angle of a total reflection at the rear surface of the light conducting plate 29 is larger than a critical angle of a total reflection at the front surface of this light conducting plate 29, and furthermore, an incident angle of the light propagated through the light conducting plate 29 at the rear surface of the light conducting plate 29 prior to the front surface thereof becomes smaller than, or equal to the critical angle of the total reflection. As a result, most of the light propagated through the light conducting plate 29 is projected from the rear surface of the light conducting plate 29. Furthermore, as represented in FIG. 7, both light reflected from a boundary plane between the light conducting plate 29 and the adhesive larger 24, and also light reflected from another boundary plane between the reflection type display panel 22 and the adhesive layer 24 are similarly full-reflected on the front surface of the light conducting plate 29, and thereafter, are projected from the rear surface of the conducting light plate 29. As a consequence, in accordance with such a forward lightening apparatus 23, substantially all of the light derived from the forward lightening apparatus 23 is projected to the reflection type display panel 22, and can hardly become invalid light, which is different from the prior art forward lightning apparatus in which the light is reflected forwardly before being entered into the reflection type display panel 22. Accordingly, screen contrast of the reflection type display apparatus 21 can be increased. Also, the loss in the light derived from the forward lightening apparatus 23 can be reduced. Furthermore, even when there is light (invalid light) leaked from the front surface of the light conducting plate 29, there is a very small amount of such invalid light, and also this invalid light is projected along the direction different from that of the display-purpose light. This invalid light never lowers the screen contrast.

Figure 8:
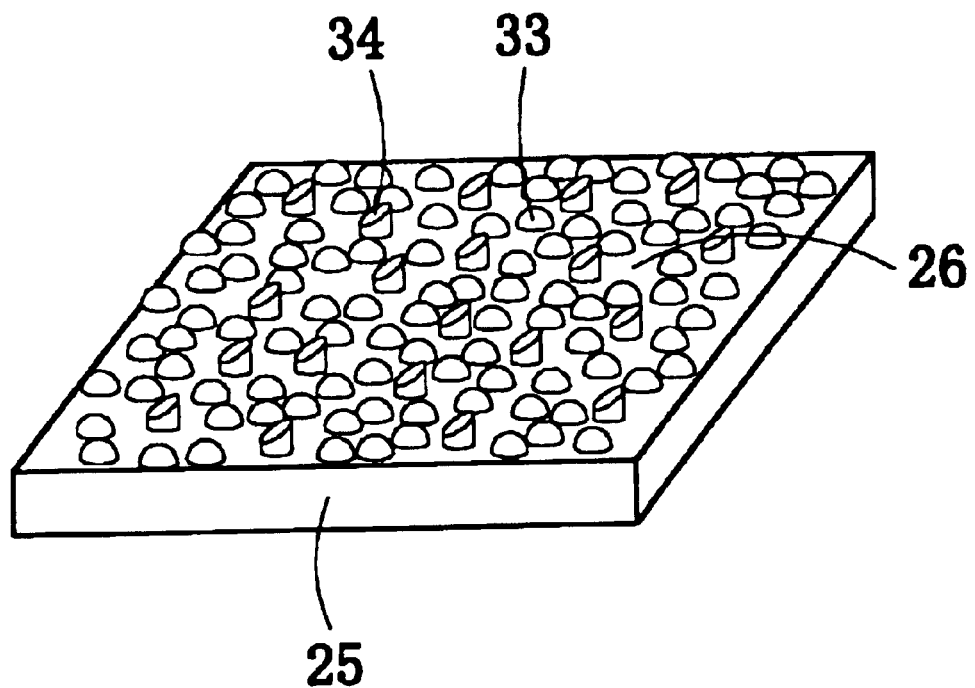
FIG. 8 is a perspective view for representing a structure of a reflection plane employed in the reflection type display apparatus.

FIG. 8 is a perspective view for indicating a shape of the above-explained reflection plane 26 which is provided inside the reflection type display panel 22. The reflection plane 26 is formed by such a material having a high reflectance factor, for example, aluminum and silver. The reflection plane 26 is constituted by a large number of very small first patterns 33 and a large number of very small second patterns 34. The first patterns 33 are employed so as to reflect external light, whereas the second patterns 34 are employed so as to reflect lightening light derived from the forward lightening apparatus 23. It should be noted that the first patterns 33 and the second patterns 34 are sparsely illustrated in FIG. 8. However, in an actual case, both the first patterns 33 and the second patterns 34 are arranged without any spaces in order to improve the light utilizing efficiency.

Figure 9:
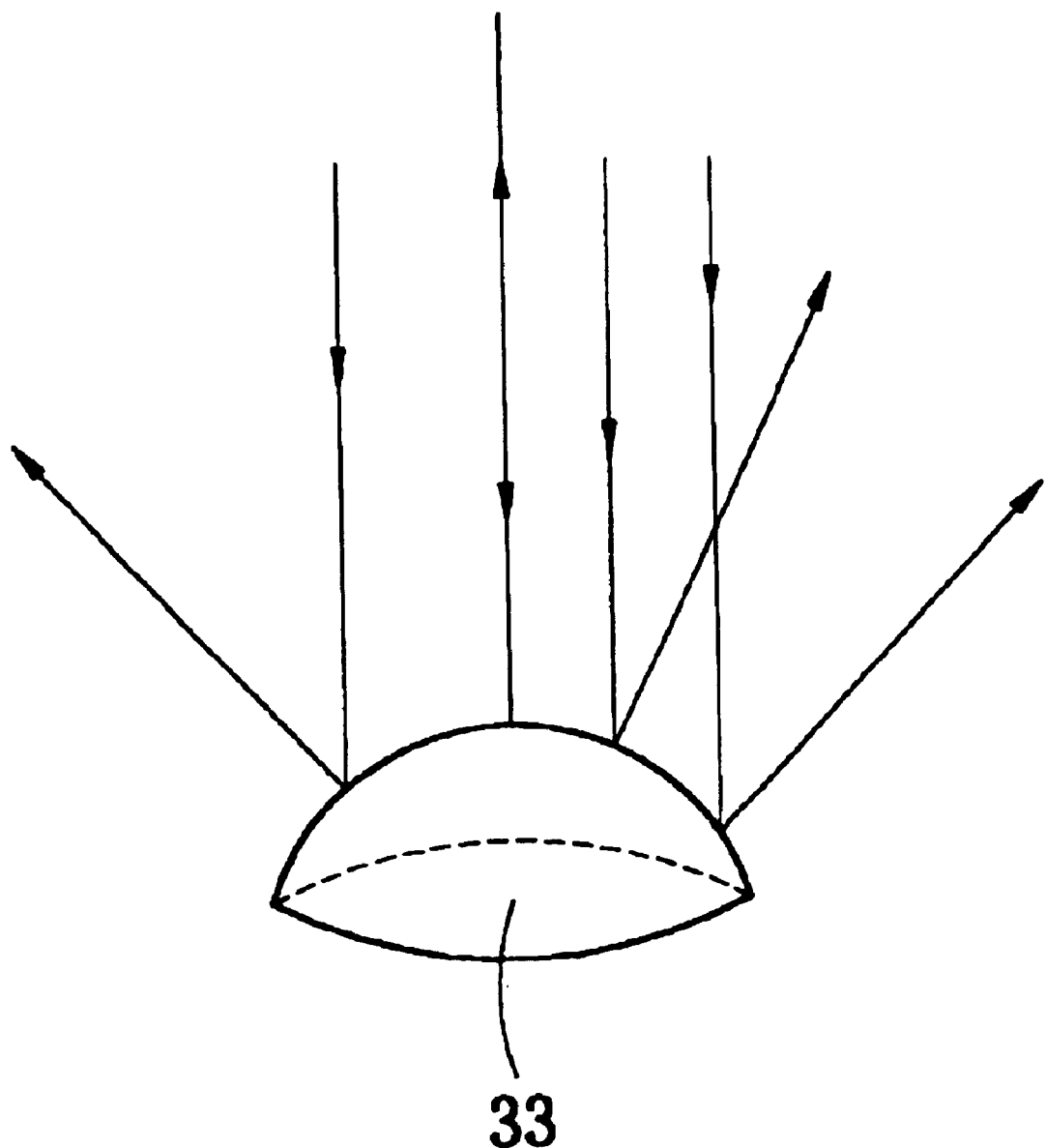
FIG. 9 is a perspective view for indicating a first pattern which constitutes the reflection plane of FIG. 8.

As indicated in FIG. 9, the first pattern 33 is formed in a substantially spherical shape in order that light entered into the reflection plane 26 at the right angle may be reflected along the original direction located perpendicular to the reflection plane 26, which having an expanded (spread) light portion.

Figure 10:
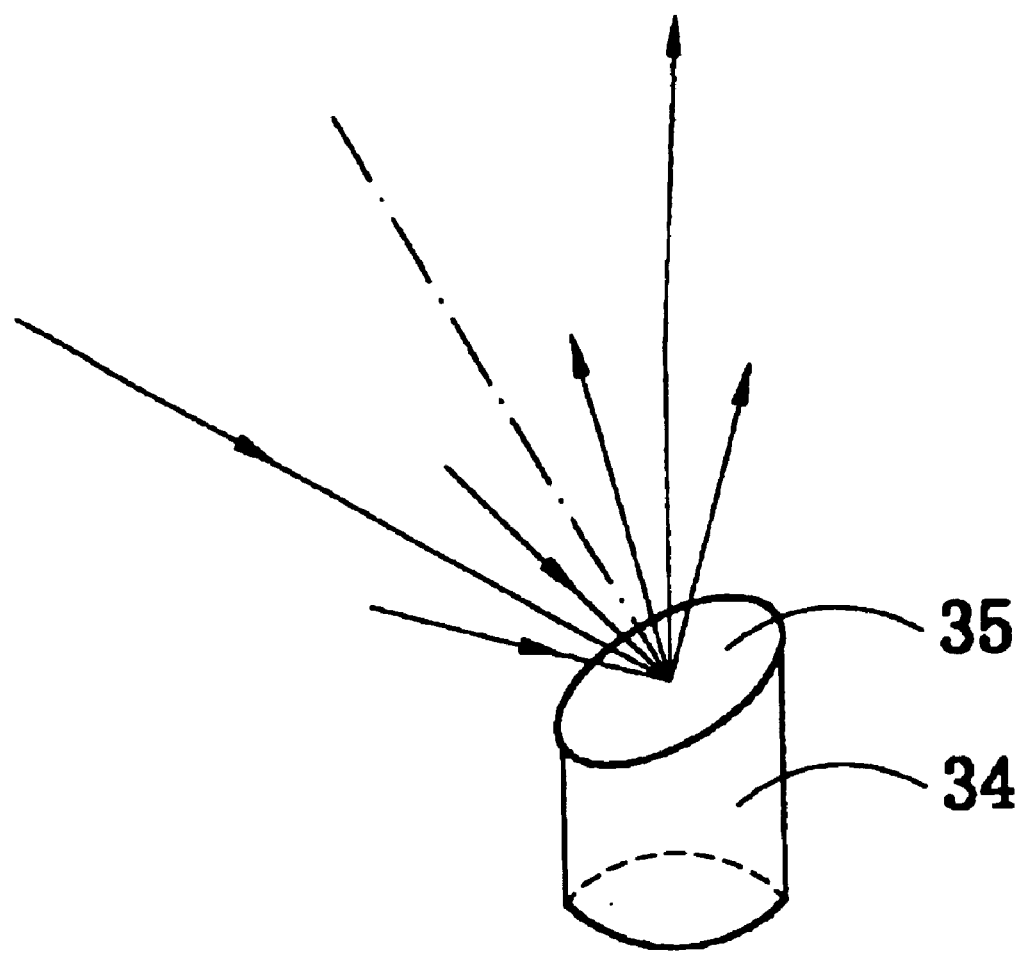
FIG. 10 is a perspective view for indicating a second pattern which constitutes the reflection plane of FIG. 8.

Also, as indicated in FIG. 10, the second pattern 34 is formed in a post shape, the upper surface of which constitutes an inclined plane 35. This inclined plane 35 is inclined toward the direction of the light source unit 30. Precisely speaking, the light projected from the forward lightening apparatus 23 is projected along an oblique direction with respect to the rear surface of the light conducting plate 29. The angle of this inclined plane 35 may be determined in such a manner that when the light projected form this forward lightening apparatus 23 along the oblique direction is reflected on the inclined plane 35, the reflection light is projected forwardly from the reflection type display apparatus 21 at a substantially right angle. It should also be noted that a lower portion of an inclined plane of the second pattern 34 may be made of an arbitrary shape such as a circular cylinder shape, a truncated cone shape, and a prism shape and so on.

Figure 11:
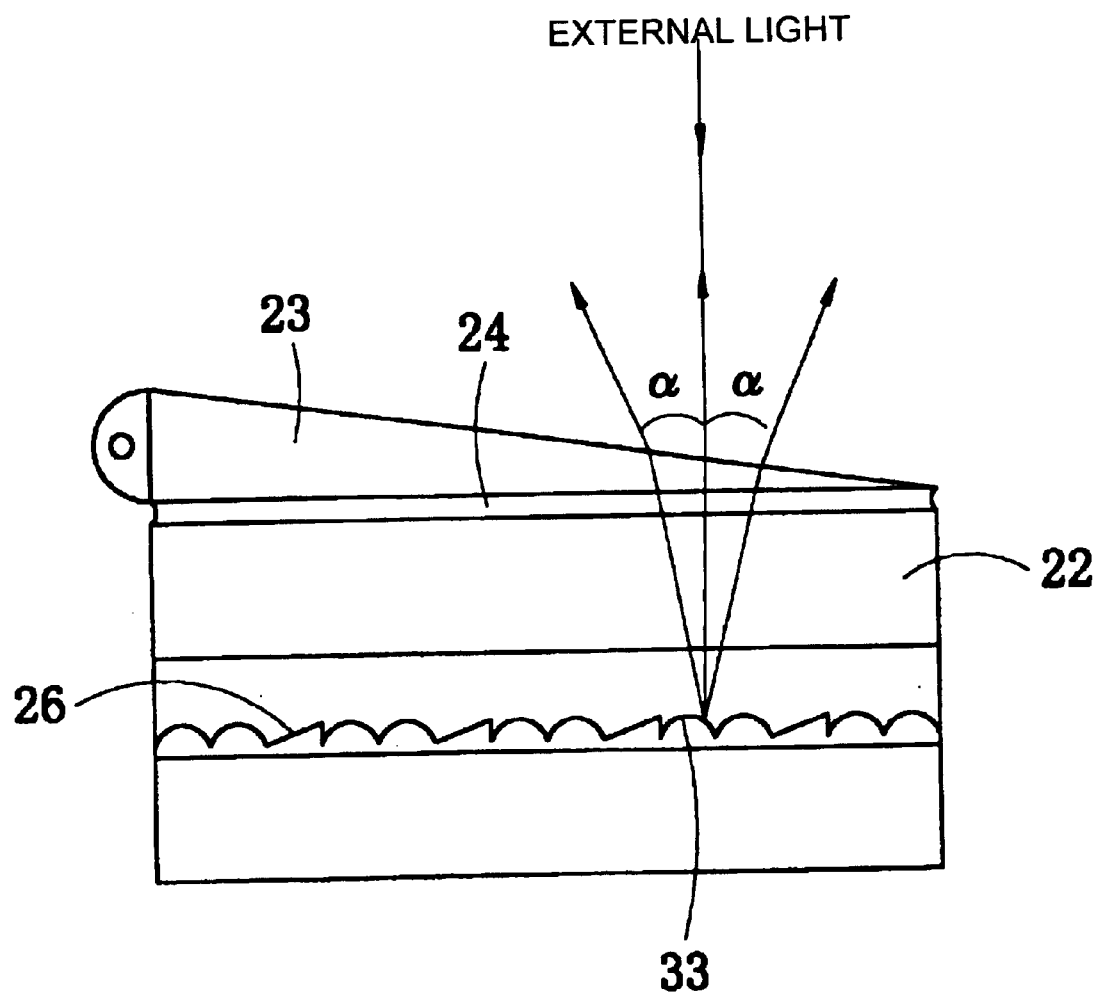
FIG. 11 is a diagram for illustratively showing behavior of external light which is entered into the reflection type display apparatus of FIG. 4.

As a consequence, as represented in FIG. 11, when the external light is entered into this forward lightening apparatus 23 from a forward direction at a substantially right angle, the light entered into the first pattern 33 is reflected substantially vertically, and is projected to the forward direction while having an expansion (spread) of "$\pm\alpha$" (namely, +30 degrees and −30 degrees). On the other hand, such external light which is reflected on the second pattern 34 is reflected along an oblique direction and is not projected to the forward direction. As a result, this reflected light does not lower the contrast of the display screen of the reflection type display apparatus 21. When a viewer views the reflection type display apparatus 21 along the oblique direction, the display content thereof can be hardly viewed, so that the light may be preferably projected at the projection angles within +30 degrees and −30 degrees. To this end, while the light reflected from the first pattern 33 is expanded, the expansion of "$\pm\alpha$" is given to the projection light from the reflection type display apparatus 21.

Figure 12:
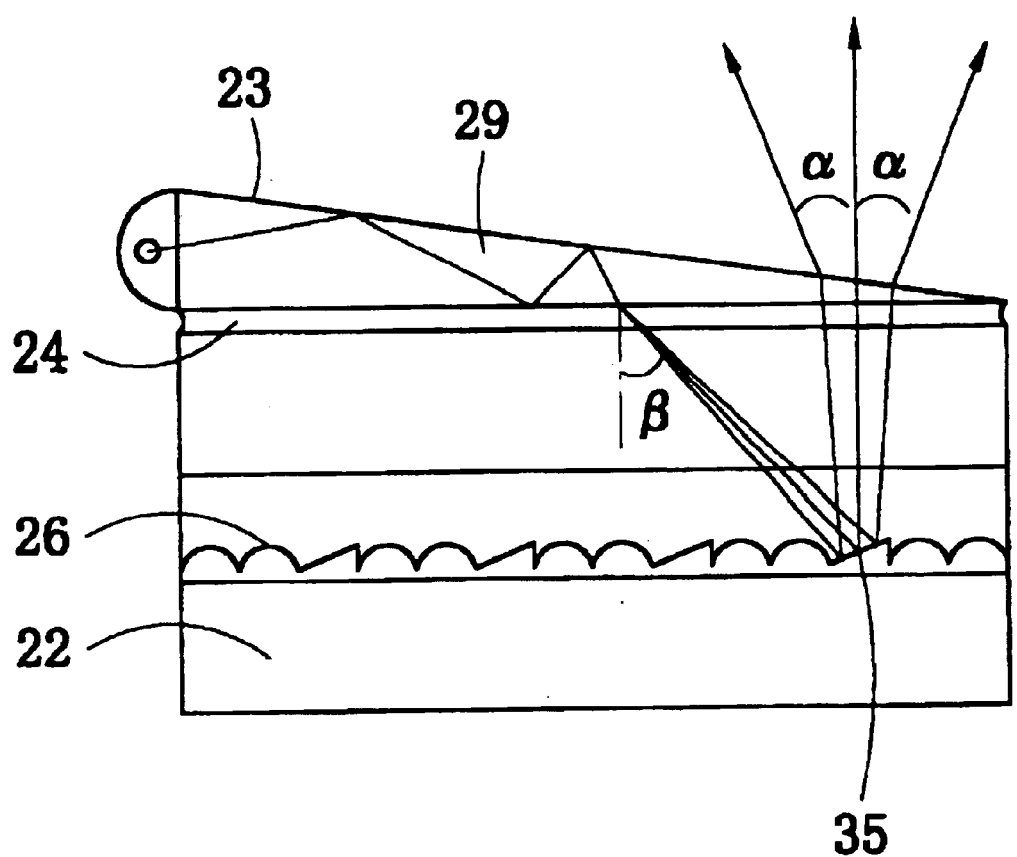
FIG. 12 is a diagram for illustratively indicating behavior of light which is projected from a light source unit in the reflection type display apparatus of FIG. 4.

Also, as indicated in FIG. 12, when the light which is projected from the rear surface of the forward lightening apparatus 23 to the oblique direction is entered into the reflection type display panel 22, such light which is correctly reflected on the inclined plane 35 of the second pattern 34 among the entered light is projected at the substantially right angle to the forward direction of the reflection type display apparatus 21. At this time, such an expansion (spread) of approximately "$\pm\alpha$" is given also to the light projected to the forward direction. This expansion is not caused by the second pattern 34, but is caused by the expansion of such light which is projected from the rear surface of the reflection type display panel 22. In other words, in order to limit the expansion of the projection light within +30 degrees and −30 degrees, the expansion of such light which is projected from the light conducting plate 29 to the oblique direction should be limited within +30 degrees and −30 degrees. Both the direction and the expansion of the light which is projected from the rear surface of the reflection type display panel 22 may be determined based upon the angle "$\phi$" of the tip portion of the light conducting plate 29, the refractive index of the light conducting plate 29, and the refractive index of the adhesive layer 24.

Figure 13A:
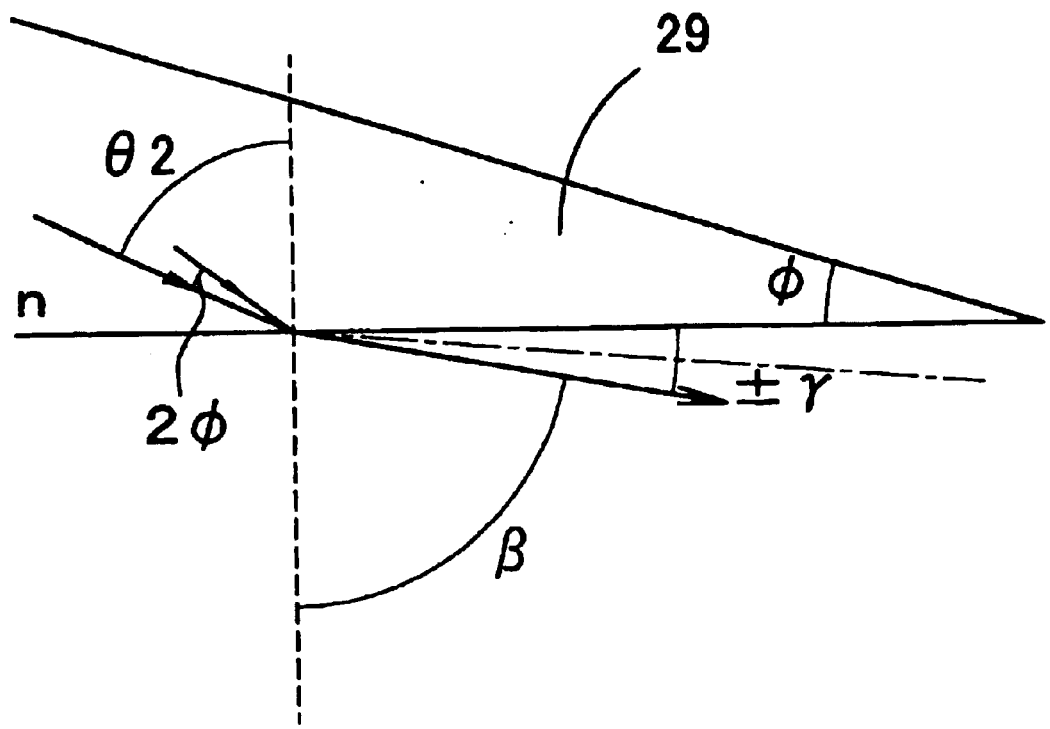
FIG. 13A and FIG. 13B are explanatory diagrams for explaining a relationship between a projection angle of light and an expanded angle of the light which is projected from the light conducting plate.
Figure 13B:
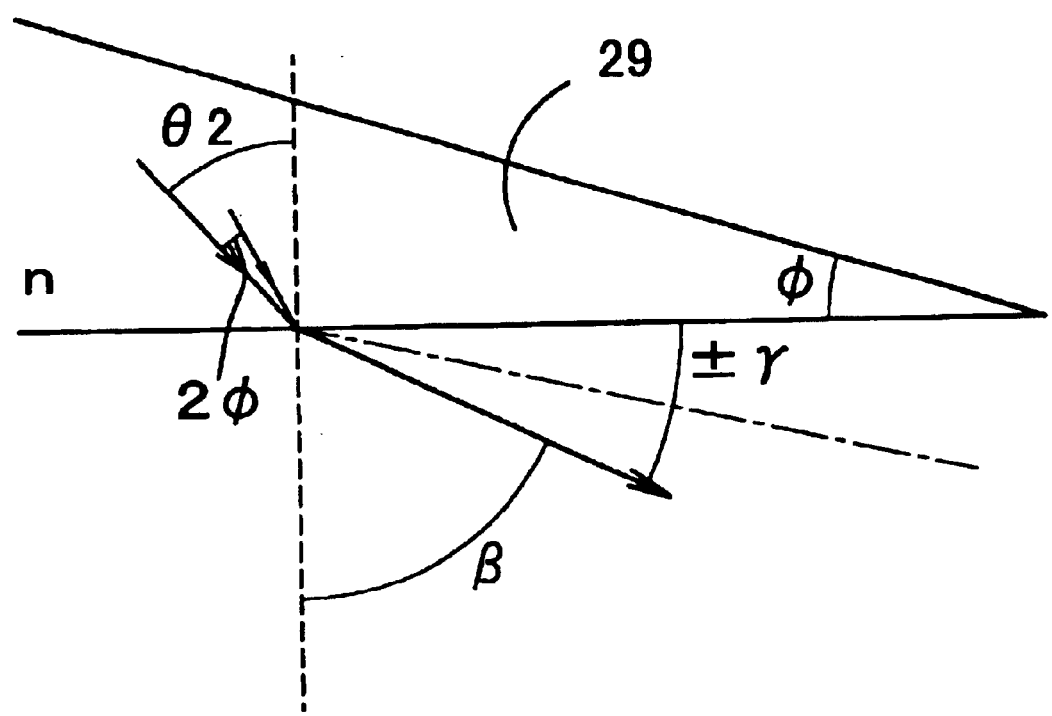

FIG. 13A and FIG. 13B are diagrams for representing behavior of light entered into the rear surface of the light conducting plate 29. FIG. 13A represents such a case that a difference "$\Delta n$" in refractive indexes between the light conducting plate 29 and the adhesive layer 24 is relatively small, and FIG. 13B shows such a case that a difference "$\Delta n$" in refractive indexes between the light conducting plate 29 and the adhesive layer 24 is relatively large. As indicated in this drawing, when a critical angle of a total reflection with respect to the rear surface of the light conducting plate 29 is assumed as "$\theta 2$", such light whose incident angle is larger than "$\theta 2 - 2\phi$" is entered into the rear surface of the light conducting plate 29. The reason why the light whose incident angle is larger than "$\theta 2 - 2\phi$" is entered into the rear surface of the light conducting plate 29 is given as follows: The light which was totally reflected on the rear surface of the light conducting plate 29 in the preceding reflection corresponds to such light, the projection angle of which is larger than, or equal to "$\theta 2$." Then, this light is totally reflected on the front surface of the light conducting plate 29, so that the incident angle is decreased by "$2\phi$." Since only such light whose incident angle is smaller than the critical angle "$\theta 2$" of the total reflection among the above-described light is projected from the rear surface, light projected from the rear surface of the light conducting plate 29 corresponds to such light whose incident angle is larger than, or equal to "$\theta 2 - 2\phi$", and smaller than, or equal to "$\theta 2$." Among the above-described light, such light which is entered at the critical angle "$\theta 2$" of the total reflection is projected substantially parallel to the rear surface of the light conducting plate 29. Also, assuming now that such light whose incident angle is equal to "$\theta 2 - 2\phi$" is projected along a direction of "$2\gamma$" with respect to the bottom surface of the light conducting plate 29, an expanded angle (spread angle) of light which is projected from the bottom surface of the light conducting plate 29 is nearly equal to "$\pm\gamma$." The larger the difference "$\Delta n$" in the refractive indexes between the light conducting plate 29 and the adhesive layer 24 is increased, the smaller the critical angle "$\theta 2$" of the total reflection is decreased. As a consequence, as shown in FIG. 13A, when the difference "$\Delta n$" in the refractive indexes is small, the expanded angle "$\pm\gamma$" of the projected light becomes narrow, whereas when the difference "$\Delta n$" in the refractive indexes is large, the expanded angle "$\pm\gamma$" of the projected light becomes wide as shown in FIG. 13B. Since a projection angle "$\beta$" of light projected from the bottom surface of the light conducting plate 29 is expressed by "$\beta - 2\gamma$", the larger the projection angle "$\beta$" is increased, the expanded angle "$\pm\gamma$" of the light is decreased. In general, in order that the expanded angle of the projection light is set within +30 degrees and −30 degrees, the projection angle "$\beta$" is desirable selected to be larger than, or equal to 45 degrees.

Also, a portion of light which is obliquely projected from the rear surface of the reflection type display panel 22 is reflected on the first pattern 33, and a portion of the reflected light is projected forwardly. However, since a ratio of this partial reflection light to the entire reflection light is very small, there is no risk to lower the contrast. In such a case that directivity of light which is obliquely projected from the rear surface of the light conducting plate 29 is high, there are some possibilities that the inclined surface 35 of the second pattern 34 is made as a curved surface so as to increase the expansion of the projected light.

As a consequence, in the case that the external light is used, and in the case that the forward lightening apparatus 23 is employed, the display-purpose light is projected along the same direction (namely, substantially forward direction), and also owns the substantially same expanded angles ("±α") As a result, it is possible to obtain the substantially same visibilities even when the external light is used and also the forward lightening apparatus 23 is employed, so that a viewer does not have a sense of incongruity. Moreover, as explained above, since the contrast can be hardly lowered by the invalid light, such better visibilities can be obtained. Also, in this reflection type display apparatus 21, there is no pattern on the front surface of the light conducting plate 29 and also the rear surface thereof. As a consequence, there is no conventional problem. That is, the projection light is diffused by the forward lightening apparatus 23 and thus, the transparent characteristic of the forward lightening apparatus 23 is deteriorated in the prior art.

Next, a description will now be made of a relationship between the first pattern 33 and the second pattern 34. As explained above, the second pattern 34 may cause a factor to constitute invalid light with respect to the external light. As a result, in the case that the external light is utilized, a total amount of these second patterns 34 should be made small as possible. To this end, a total number (density) of the second patterns 34 is made smaller than a total number (density) of the first patterns 33. For example, in FIG. 14, a ratio of the first patterns 33 to the second patterns 34 is selected to be 90% to 10%.

Figure 14:
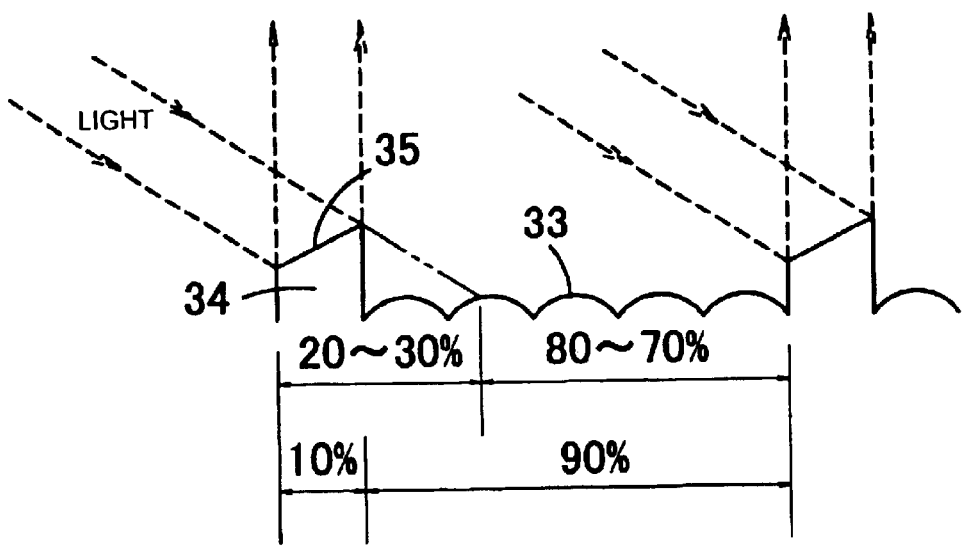
FIG. 14 is an explanatory diagram for explaining a ratio of the first pattern to the second pattern.

As shown in FIG. 14, considering to such a case that the ratio of the second patterns 34 is selected to be 10%, such external light which is reflected by this second pattern 34 to constitute loss is nearly equal to 10%, and the screen of the reflection type display apparatus 21 merely becomes dark, as compared with the total reflection type liquid crystal display apparatus. Also, even when only 10% of the second patterns 34 for reflecting the light of the light lightening apparatus 23 along the forward direction are provided, the light of the forward lightening apparatus 23 is projected along the oblique direction. As a result, as indicated in FIG. 14, in an actual case, 20 to 30% of the light derived from the forward lightening apparatus 23 can be reflected along the forward direction. It should be noted that 100% of the light derived from the forward lightening apparatus 23 may be reflected, depending upon an angle of light derived from the forward lightening apparatus 23 and the density of the second patterns 34. Considering to both brightness and directivities (expansions) of the external light and the forward lightening apparatus 23, if 20 to 30% of the light derived from the forward lightening apparatus 23 may be reflected along the forward direction, then the resultant reflection type display apparatus 1 may be practically used.

Figure 15:
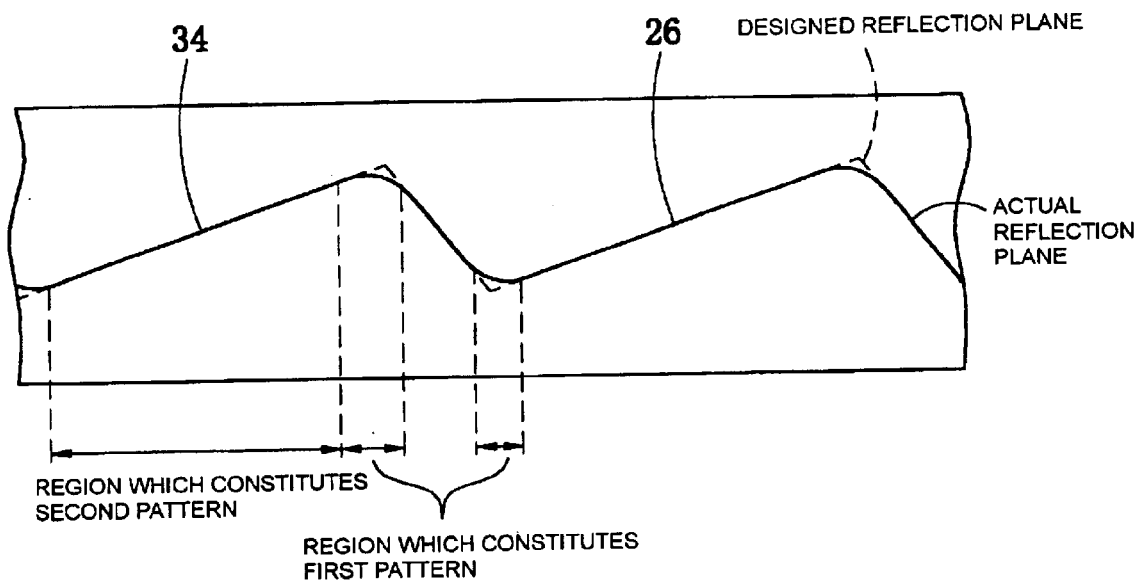
FIG. 15 is a schematic diagram for showing a second pattern in which a summit point and a valley portion are rounded.
Figure 16A:
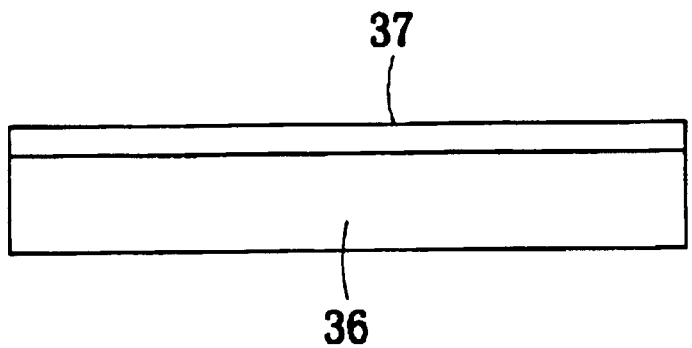
FIG. 16A to FIG. 16D are diagrams for showing steps used to manufacture a stamper for duplicating a reflection plane.
Figure 16B:
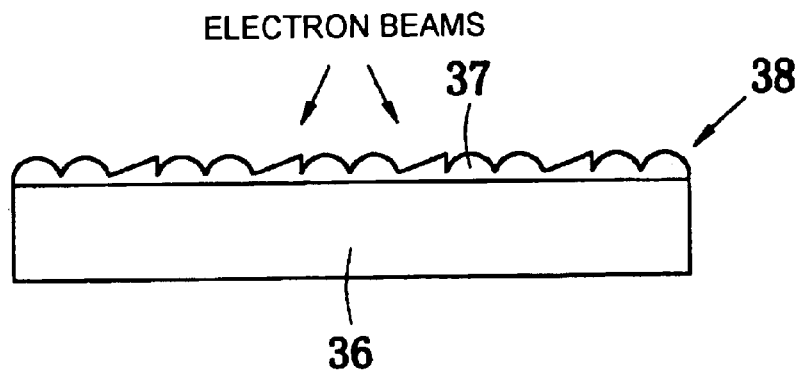
Figure 16C:
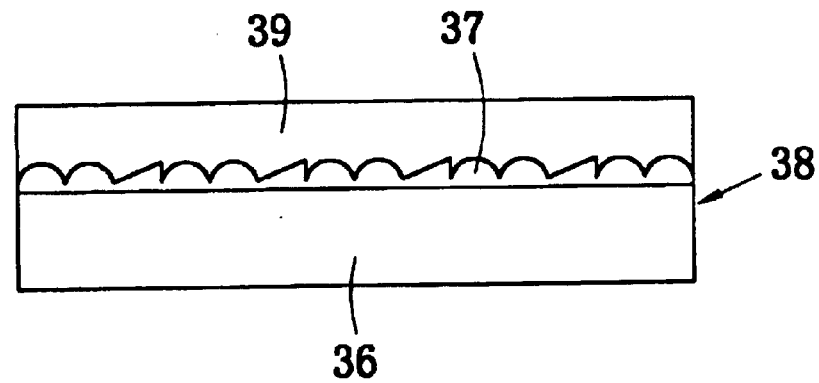
Figure 16D:
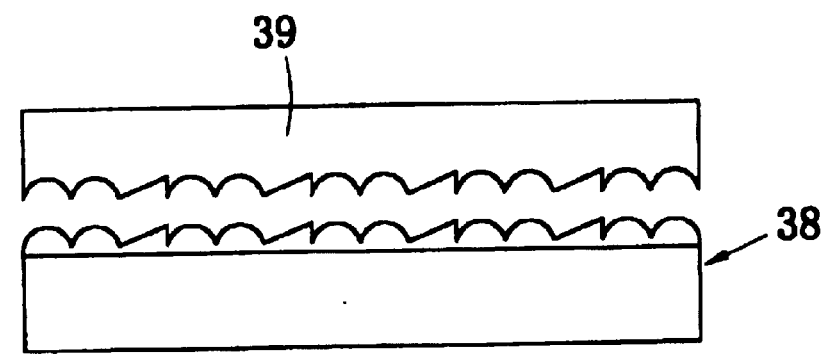
Figure 17A:
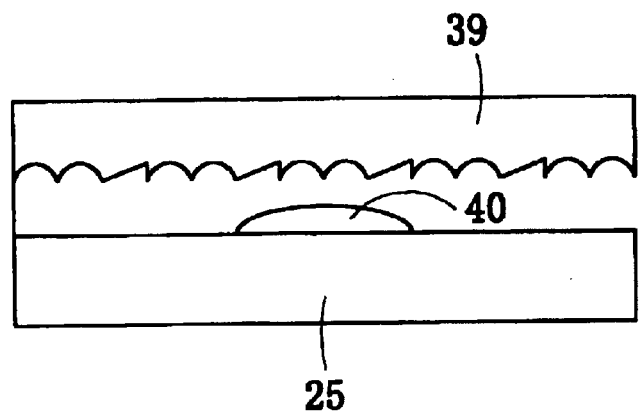
FIG. 17A to FIG. 17D are diagrams for representing steps of duplicating a reflection plane by way of the 2P (photopolymerization) method, while employing the stamper shown in FIG. 16.
Figure 17B:
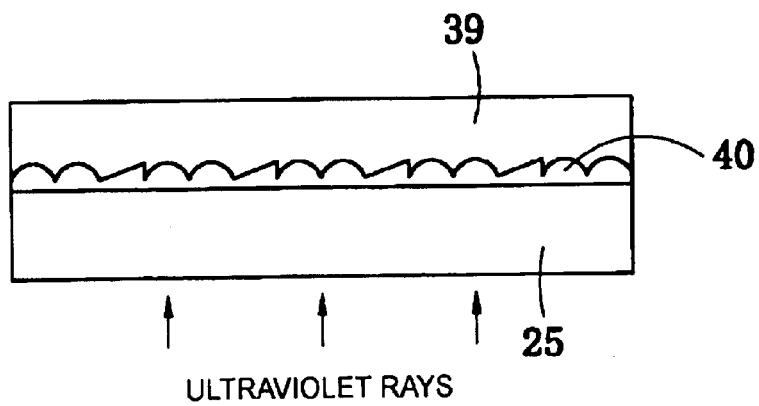
Figure 17C:
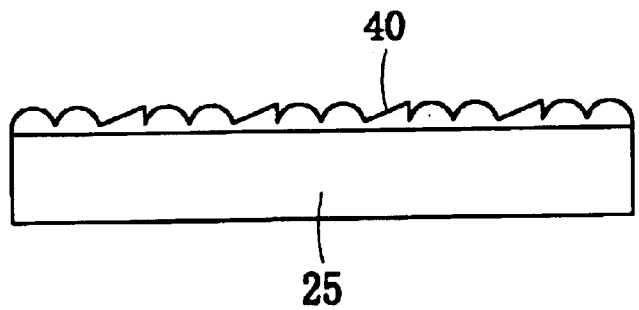
Figure 17D:
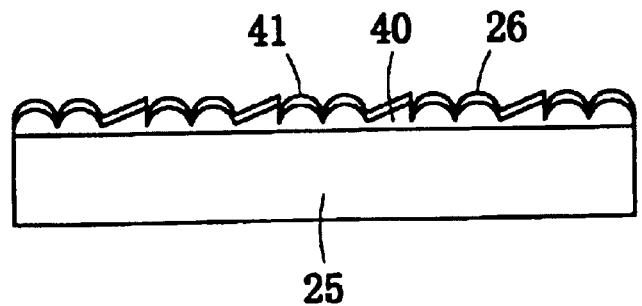
Figure 18A:
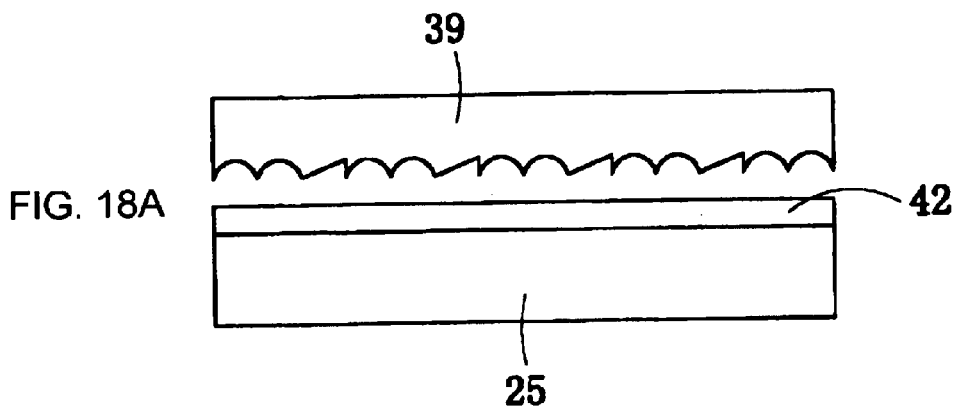
FIG. 18A to FIG. 18D are diagrams for representing steps of duplicating a reflection plane by way of an emboss method, while employing the stamper shown in FIG. 16.
Figure 18B:
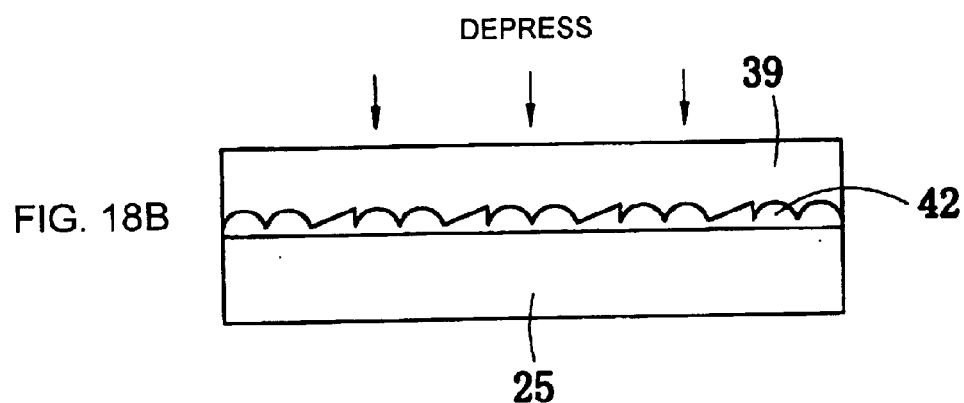
Figure 18C:
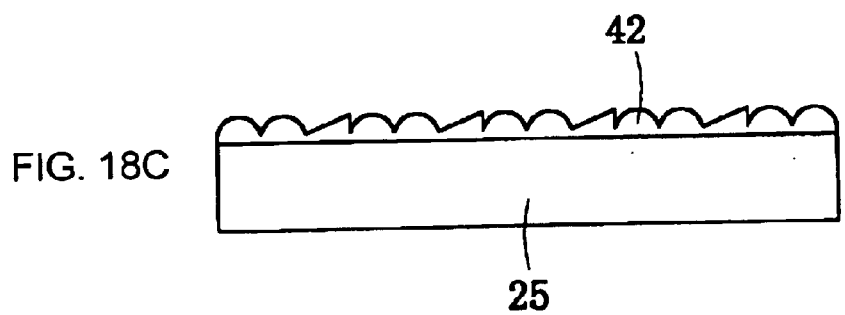
Figure 18D:
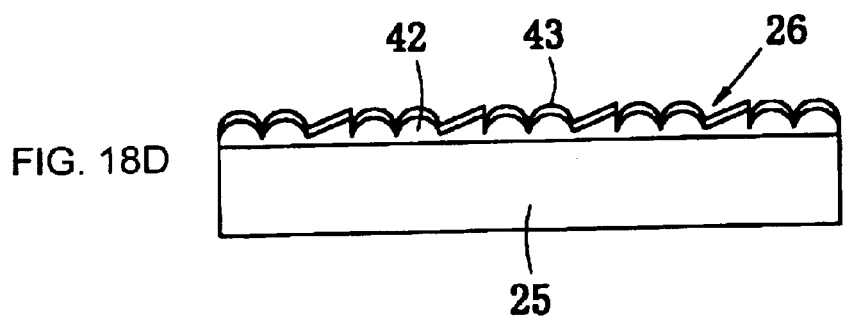

It should also be noted that the ratio of the first patterns 33 to the second patterns 34 is not limited to the above-described ratio of 9:1, but may be properly changed based upon brightness of the forward lightening apparatus 23 and the use environment of this reflection type display apparatus 21. Also, in such a case that a concave/convex pattern such as a triangular-shaped pattern as indicated by a broken line in FIG. 15 is formed, angles of summit points and also angles of valley portions are not always made in acute angles, depending upon forming methods thereof. For instance, as represented by a solid line of FIG. 15, these portions may constitute gentle planes. Accordingly, while the inclined plane is employed as the second pattern 34 by utilizing this idea, the gentle summit points and the gentle valley portions may be used as the first patterns 33. As a consequence, even when only such second patterns 34 whose upper surfaces constitute the inclined planes are employed, both the function of the first pattern 33 and the function of the second pattern 34 may be realized. Therefore, even when only such second patterns are arranged, the resultant reflection type display apparatus 1 may be practically operable.

It should also be noted that both the first patterns 33 and the second patterns 34 are arranged at random in order to prevent coloring effects caused by inference of light.

Forming Method of Reflection Plane

Next, referring to FIG. 16 and FIG. 17, an explanation is simply made of a method for manufacturing the reflection plane 26 on the surface of the board 25 by way of a so-called "2P (photo-polymerization)" method. In this 2P method, a mold called as a stamper for the reflection plane 26 is formed, and then, a large number of reflection planes are duplicated by using this stamper.

First, a method of manufacturing the stamper will now be explained. While a board 36 is prepared, electron beam resist 37 is coated on this board 36 (see FIG. 16A). Subsequently, the electron beam resist 37 which is patterned by exposing an electron beam thereon is softened so as to form a predetermined shape of a reflection plane, so that a mother plate 38 is formed (see FIG. 16B). Next, a stamper material such as nickel is deposited on the mother plate 38 by way of an electroforming method, so that a nickel stamper 39 is manufactured (see FIG. 16C). Thereafter, this stamper 39 is separated from the mother plate 38 so as to obtain the stamper 39 (see FIG. 16D). This stamper 39 owns a pattern having such a shape that the pattern of the reflection plane is inverted, and thus, may constitute a mold used to duplicate the reflection plane 26.

Next, a process operation for duplicating a reflection plane by way of the so-called "2P" method by employing the stamper 39 will now be explained. While a transparent board 25 is prepared, ultraviolet photosensitive resin (so-called "UV hardening resin") 40 is dropped on the board 25, and the stamper 39 is hardened over this ultraviolet photosensitive resin (see FIG. 17A). Next, the ultraviolet photosensitive resin 40 dropped on the board 25 is sandwiched between the stamper 39 and the board 25 and then is depressed in order that this ultraviolet photosensitive resin 40 is depressed/extended between the board 25 and the stamper 39. Then, ultraviolet rays are irradiated from the lower portion of the board 25 to this ultraviolet photosensitive resin 40 (see FIG. 17B). At this time, the ultraviolet photosensitive resin 40 is hardened by the ultraviolet rays which have passed through the board 25. After the ultraviolet photosensitive resin 40 has been hardened, the board 25 is stripped from the stamper 39 in conjunction with the ultraviolet photosensitive resin 40 (see FIG. 17C). The pattern of the reflection plane 26 has been transferred to this stripped ultraviolet photosensitive resin 40. Subsequently, while the surface of the ultraviolet photosensitive resin 40 is covered by a covering film 41 such as aluminum and silver by employing the sputtering method, the reflection plane 26 is formed (see FIG. 17D). The reflection plane 26 may be manufactured in a mass production manner in accordance with this 2P method.

FIG. 18 illustratively shows another manufacturing method of the reflection plane 26. This indicates a process operation for manufacturing the reflection plane 26 by way of an emboss method. In this emboss method, resin (for example, acrylic resin) 42 is unformly coated on the board 25 (alternatively, non-transparent board may be employed) by way of the spin coating manner (see FIG. 18A). Subsequently, after the resin 42 has been once hardened, this hardened resin is softened by being again heated. Thereafter, this resin 42 is depressed over the softened resin by the stamper 39. Then, the resin 42 is sandwiched between the board 25 and the stamper 39 so as to transfer the pattern of the stamper 39 to the resin 42 (see FIG. 18B). After the resin 42 has been hardened by being heated, or by being released, when the stamper 39 is stripped from the resin 42, the pattern of the reflection plane 26 may be transferred to the surface of the hardened resin 42 by the stamper 39 (see FIG. 18C). Subsequently, while the surface of the resin 42 is covered by a covering film 43 such as aluminum and silver by employing the sputtering method, the reflection plane 26 is formed (see FIG. 18D). The reflection plane 26 may also be manufactured in a mass production manner in accordance with this emboss method.

Modification of Reflection Plane

Figure 19A:
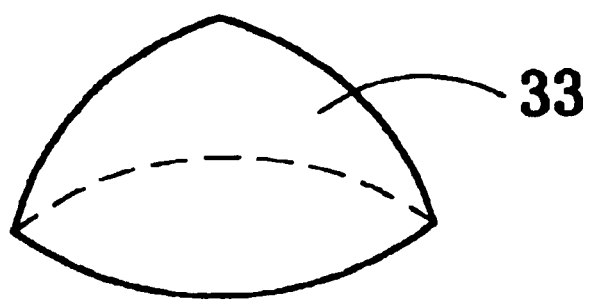
FIG. 19A and FIG. 19B are perspective views for indicating a first pattern and a second pattern, formed in accordance with another mode.
Figure 19B:
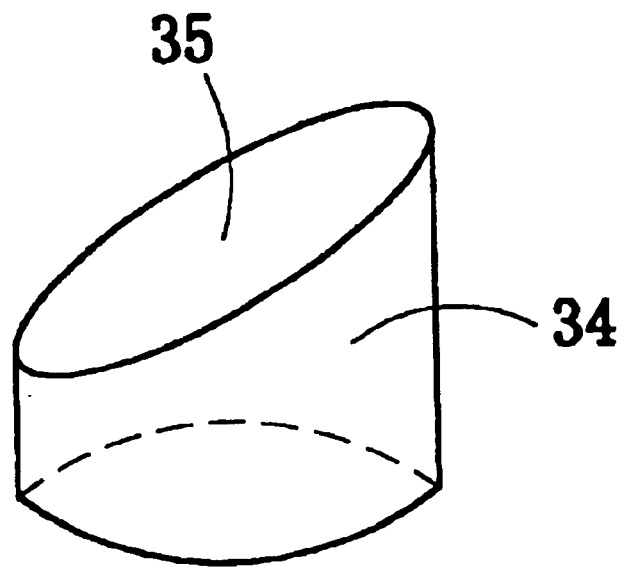

Next, a modification of the above-explained embodiment mode will be described. FIG. 19 illustratively shows a modification of a pattern formed on the reflection plane 26. That is, any of the first pattern 33 and the second pattern 34 does not own such a plane (will be referred to as a "parallel plane" hereinafter) which is located in parallel to the front surface of the reflection type display panel 22. In other words, the first pattern 33 shown in FIG. 9 owns a tangential plane which is located in parallel to the front surface of the reflection type display panel 22. In contrast thereto, the first pattern 33 shown in FIG. 19A is formed in a semispherical shape as a whole. However, since the tip portion is sharped, this first pattern 33 does not own such a tangential plane (parallel plane) which is located in parallel to the front surface of the reflection type display pane 22. Also, since the second pattern 34 indicated in FIG. 10 originally owns no such a plane which is located in parallel to the front surface of the reflection type display panel 22, the second pattern 34 indicated in FIG. 19B is the same as the second pattern 34 represented in FIG. 10.

While the front surface of the forward lightening apparatus 23 is inclined, this inclination angle may be sometimes set to a small value. Also, in order to protect the front surface of the reflection type display apparatus 21, a transparent plate such as a glass plate and a plastic plate may be positioned in front of the forward lightening apparatus 23. In such a case that external light which is entered from the forward direction at a right angle is reflected on either the front surface of the forward lightening apparatus 23 or the transparent plate, this external light is vertically reflected to the forward direction. On the other hand, when the first pattern 33 owns the parallel plane, the external light which is vertically entered from the forward direction is reflected on this parallel plane of the first pattern 33, and then, this external light is reflected toward the forward direction. As a result, the reflection direction of the external light which is reflected on the parallel plane of the first pattern 33 is made coincident with the reflection direction of the external light which is reflected on the transparent plate, so that contrast of the display screen is lowered, and therefore, visibility is lowered at the right front surface. Also, when the reflection type display apparatus 21 is viewed from the direct reflection direction, the display screen thereof may dazzle eyes of a viewer and thus, may give unpleasant feelings. It should also be noted that the planes which constitute any planes other than the reflection plane (inclined plane 35) in the second pattern 34 shown in FIG. 10 are not always located perpendicular to the surface of the reflection type display apparatus.

As a consequence, normally, since the viewer does not view the reflection type display apparatus 21 along the direct reflection direction, the light which is projected along the direct reflection direction becomes useless. Accordingly, as explained in this modification, if the parallel plane is deleted and the light is not projected along the right front surface direction, then the amount of light which is projected at the visible angle may be increased, so that the display screen may be made brighter.

Figure 20:
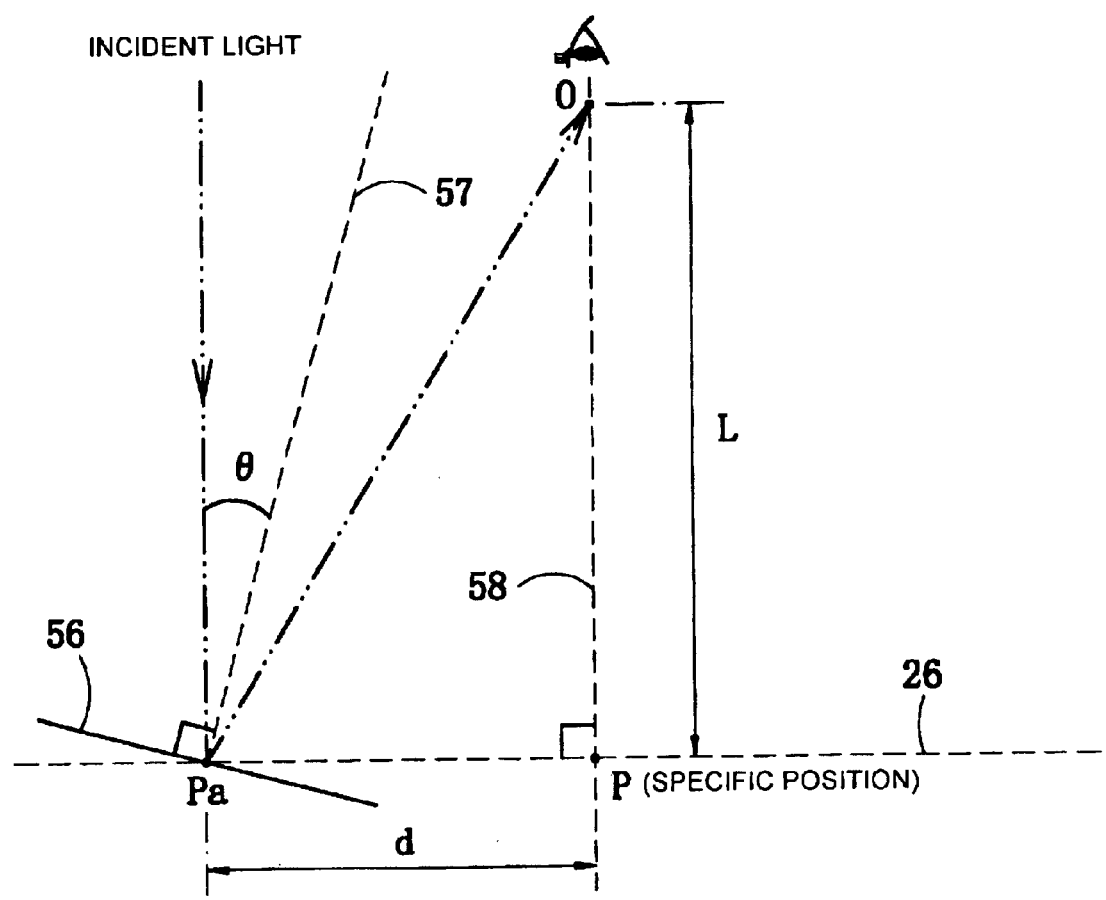
FIG. 20 is an explanatory diagram for explaining a method of designing an average gradient angle of a reflection plane in order that a luminance central axis of reflection light is concentrated to a specific region.

Also, when a normal line stood on an averaged inclined plane of concave/convex patterns is directed to a forward specific region of the reflection plane 26, each of reflection light luminance central axes of both the external light which has been entered and thereafter is reflected on the reflection plane 26, and the light which is entered from the forward lightening apparatus 23 and then is reflected on the reflection plane 26 may be converged to a specific position in front of the reflection type display panel 22, so that an image observed at this specific position may be made brighter. This averaged inclined plane corresponds to a totally averaged inclined plane of both the first pattern 33 and the second pattern 34. For instance, as shown in FIG. 20, it is so assumed that while an arbitrary point "P" on the reflection plane 26 is defined as the specific position, such a point which is separated from the reflection plane 26 by a distance "L" on a normal line 56 of the reflection plane 26 which passes through the point "P" is defined as a view point "O" of a viewer, whereas such a point which is separated from the point "P" by a distance "d" on the reflection plane 26 is defined as "Pa." In this case, when an averaged inclined plane at each of the above-described points "Pa" is designed under such a condition, as represented in FIG. 20, the luminance central axes of the light which is entered from the front surface and is reflected on the reflection plane 26 can be converged to the view point "O" of the viewer, and therefore, bright images can be obtained at the view point "O" of the viewer. The above-described condition is given as follows: An inclination of a normal line 57 which stands on an averaged inclined plane 56 at an arbitrary point "Pa" may be inclined from another normal line 58 stood on the reflection plane 26 to the point "P" (or, view point "O" of viewer) side by the below-mentioned angle "θ":

$$\theta = (\tfrac{1}{2}) \arctan (d/L) \qquad (2).$$

Figure 21:
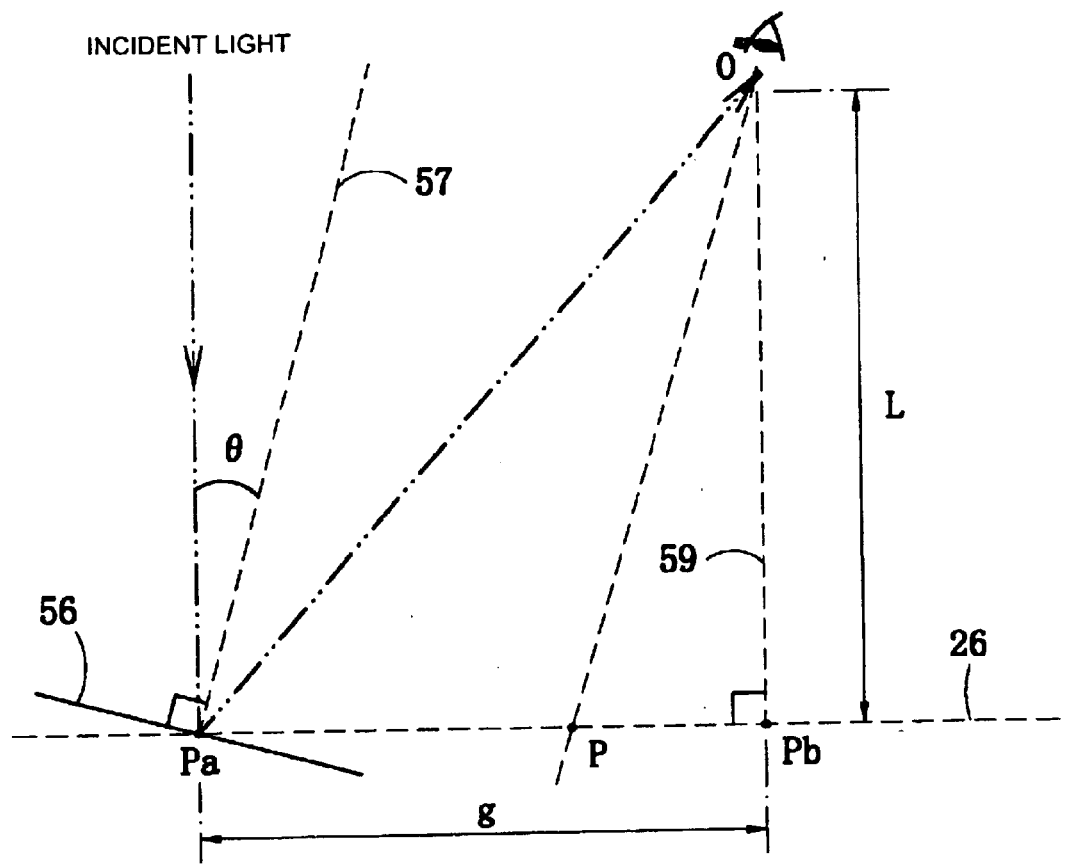
FIG. 21 is an explanatory diagram for explaining another method of designing an average gradient angle of a reflection plane in order that a luminance central axis of reflection light is concentrated to a specific region.

Also, as shown in FIG. 21, in such a case that the view point "O" of the viewer is not present on the normal line 58 which passes through the point "P" on the reflection plane 26, an inclination angle "θ" of the averaged inclined plane 56 may be determined by setting an inclination "θ" of the normal line 57 stood on the averaged inclined plane 56 at the point "Pa" as the below-mentioned angle:

$$\theta = (\tfrac{1}{2}) \arctan (g/L) \qquad (3),$$

assuming now that a cross point between the reflection plane 26 and a vertical line 59 drawn from the view point "O" of the viewer to the reflection plane 26 is defined as "Pb", and also a distance between this cross point "Pb" and the arbitrary point "Pa" on the reflection plane 26. As a result, the inclination angle "θ" of the normal line 57 of the averaged inclined plane 56 which can be converged into the view point "O" may be determined. It should also be noted that the specific position "P" is not limited only one point, but as plurality of specific positions may be employed.

Alternatively, while the shape of the first pattern 33 and the shape of the second pattern 34 are modulated by the different modulation manners, the angle of the normal line stood on the averaged inclined plane of the first pattern 33 is made different from the angle of the normal line stood on the averaged inclined plane of the second pattern 34 on the same point on the reflection plane 26. Such external light which is entered from different directions and also the light derived from the forward lightening apparatus 23 are reflected along the same direction, and furthermore, the luminance central axes of the respective reflection light as to the external light and the light derived from the forward lightening apparatus 23 may be collected to a specific position, and the luminance central axes of the reflection light of both light may be collected to the specific position.

Figure 22:
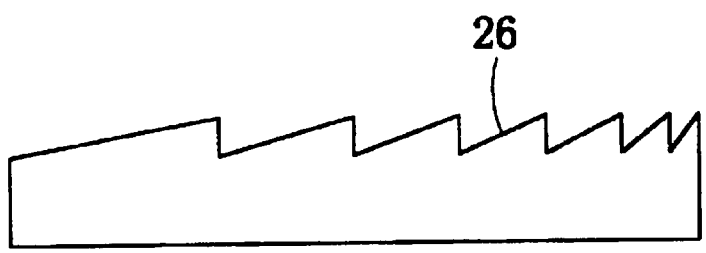
FIG. 22 is an explanatory diagram for explaining a concave/convex pattern having different reflection planes.
Figure 23:
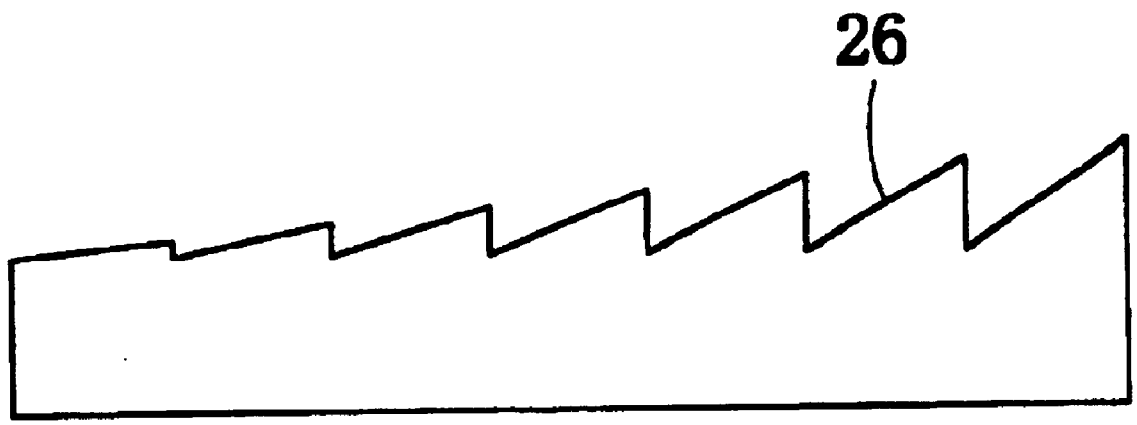
FIG. 23 is an explanatory diagram for explaining another concave/convex pattern having different reflection planes.
Figure 24:
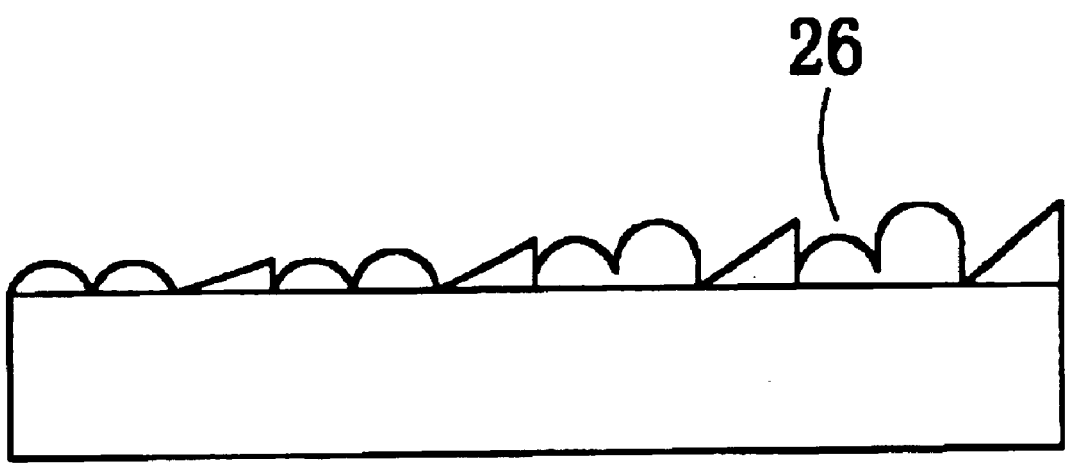
FIG. 24 is an explanatory diagram for explaining another concave/convex pattern having different reflection planes.

Also, the averaged inclined planes of the reflection plane 26 are not limited to be made of unform planes. Alternatively, as indicated in FIG. 22, the averaged inclined plane of the reflection plane 26 may be formed as such modulation patterns having the same height and the different pitches. Further, as indicated in FIG. 23, the averaged inclined plane of the reflection plane 26 may be formed as such modulation patterns having the same pitch and the different heights. Also, as indicated as the reflection plane 26 of FIG. 24, an inclination angle of a concave/convex pattern may be modulated by combining the modulation pattern shown in FIG. 22 with the modulation pattern shown in FIG. 23. Further, as indicated in FIG. 23, the averaged inclined plane of the reflection plane 26 may be formed as such modulation patterns having the same pitch and the different heights. Also, as indicated as the reflection plane 26 of FIG. 24, an inclination angle of a concave/convex pattern may be modulated by combining the modulation pattern shown in FIG. 22 with the modulation pattern shown in FIG. 23.

Although not shown in the drawing, the concave/convex patterns of the reflection plane may be arranged at random on this reflection plane, so that such an image deterioration as moire fringes, which is caused by the pixel pattern of the reflection type display panel may be prevented. It is so assumed that an inclination angle "θ" of a normal line of an averaged inclined plane of each of the concave/convex patterns is determined based upon the above-explained formula (2), depending upon a position of each concave/convex pattern. Also, the vertical planes shown in FIG. 22 to FIG. 24, which are caused by inclining the averaged inclined plane, may not be vertically positioned.

Figure 25:
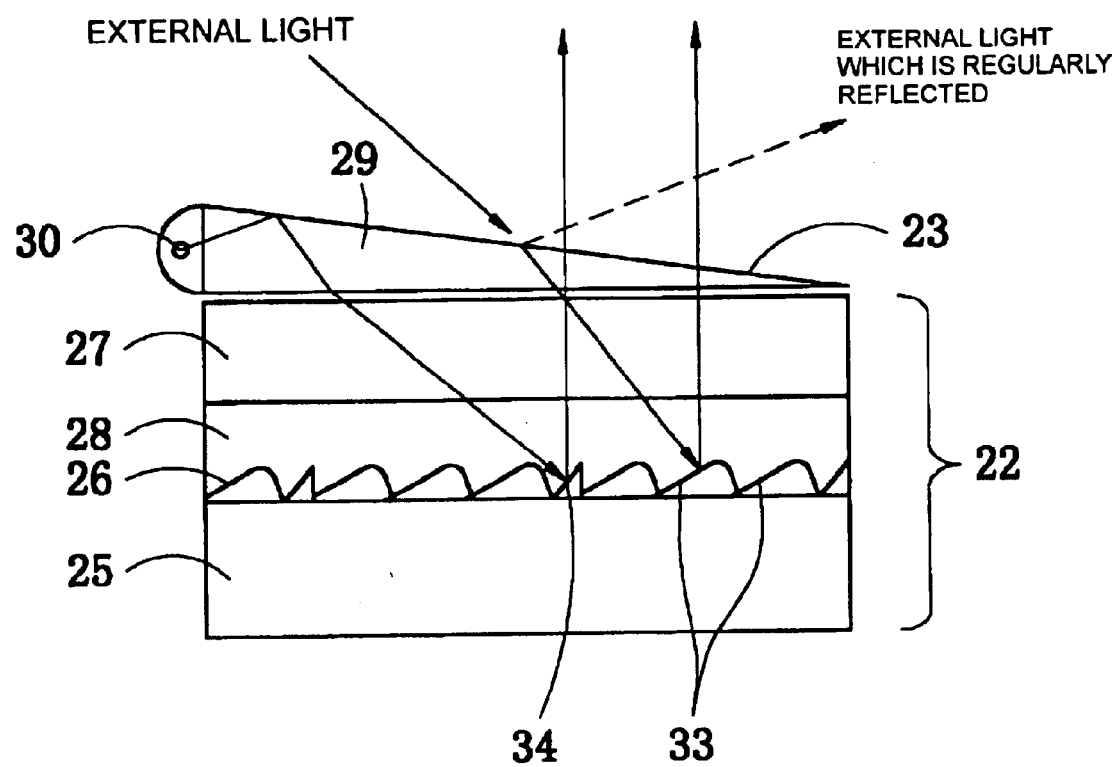
FIG. 25 is a sectional view for schematically showing a structure of a reflection type display apparatus used to explain a concave/convex pattern which is pattern-modulated.

Also, as indicated in FIG. 25, in such a case that a reflection direction of such external light is adjusted which is obliquely entered by making the first patterns 33 in an asymmetrical shape, and furthermore, a direction along which the incident light from the forward lightening apparatus 23 is reflected is adjusted by optimizing the angle of the inclined plane of the second pattern 34, both the external light entered from an arbitrary direction and the incident light derived from the forward lightening apparatus 23 may be grouped to be reflected along such a direction different from the direct reflection direction of the external light on the reflection type display panel. As a consequence, it is possible to avoid such a phenomenon that images can be hardly viewed due to the regular reflection light.

Modification of Forward Lightening Apparatus

Figure 26:
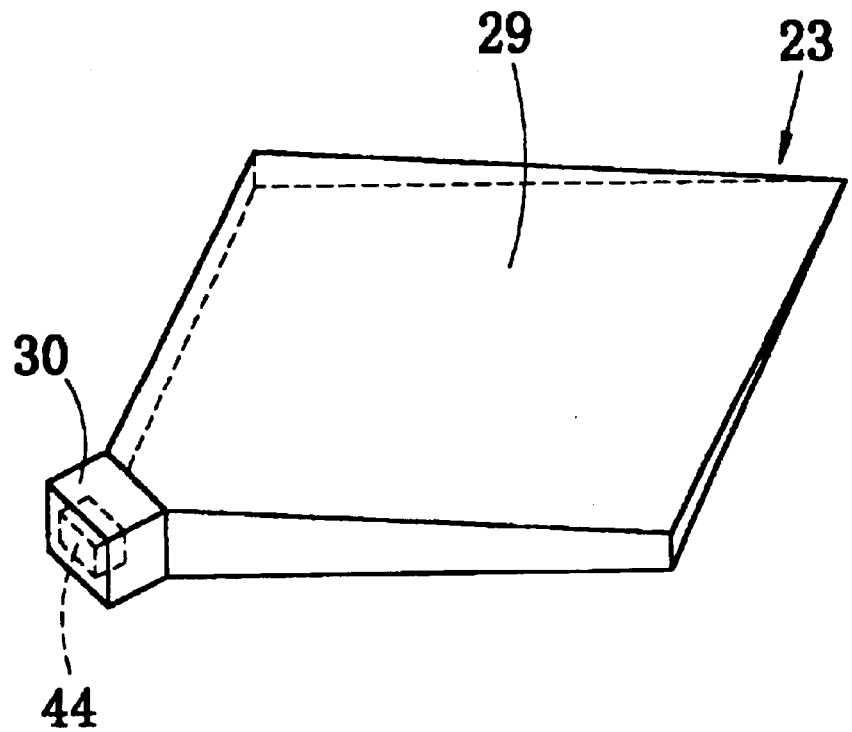
FIG. 26 is a perspective view for indicating a forward lightening apparatus, according to another mode, employed in the reflection type display apparatus of the first embodiment.

FIG. 26 illustratively shows a modification of the above-described forward lightening apparatus 23. In the above-explained forward lightening apparatus 23, the line-shaped light source is arranged opposite to one edge of the light conducting plate 29 as the light source unit 30. In this modification of the forward lightening apparatus 23, a light source unit 30 (so-called "point light source") with employment of a light emitting element 44 such as an LED is arranged at a corner of the light conducting plate 29. Since the light source unit 30 is arranged at the corner of the light conducting plate 29, this light conducting plate 29 is formed in such a wedge shape that a thickness of a corner of this light conducting plate 29, which corresponds to the light source unit 30, becomes a maximum thickness, whereas a thickness of another corner thereof positioned along a diagonal direction with respect to the corner where the light source unit 30 is arranged becomes a minimum thickness.

Although not shown in this drawing, the light source unit 30 made in the point light source form may be arranged at a center portion of one edge of the light conducting plate 29.

Figure 27:
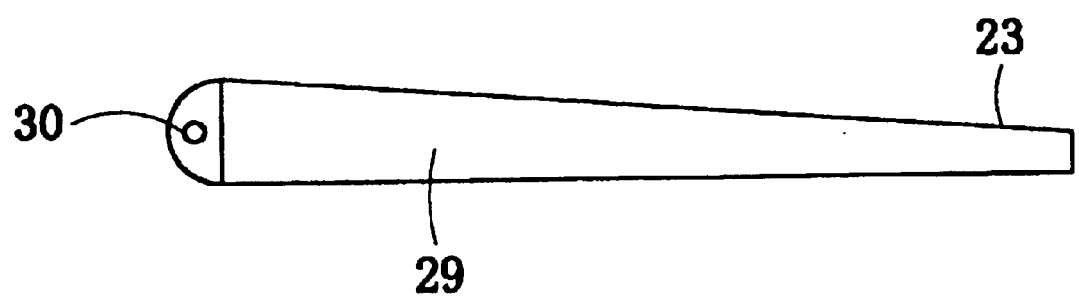
FIG. 27 is a side view for indicating a forward lightening apparatus, according to a further mode, employed in the reflection type display apparatus of the first embodiment.

Also, if the light conducting plate 29 of the forward lightening apparatus 23 is tapered in such a manner that the thickness of this light conducting plate 29 becomes thinner while the light conducting plate 29 is separated far from the light source unit 30, as explained above, then the light projected from the rear surface side is inclined, so that lowering of the screen contract can be prevented. As a consequence, as represented in FIG. 27, an edge portion having a thinner thickness of a wedge-shaped light conducting plate 29 may have a certain thick thickness. When such a wedge-shaped light conducting plate 29 is employed, although loss of light occurs at the tip portion of the light conducting plate 29, since the strength of this tip portion increased, productivity of this light conducting plate 29 may be improved.

Figure 28:
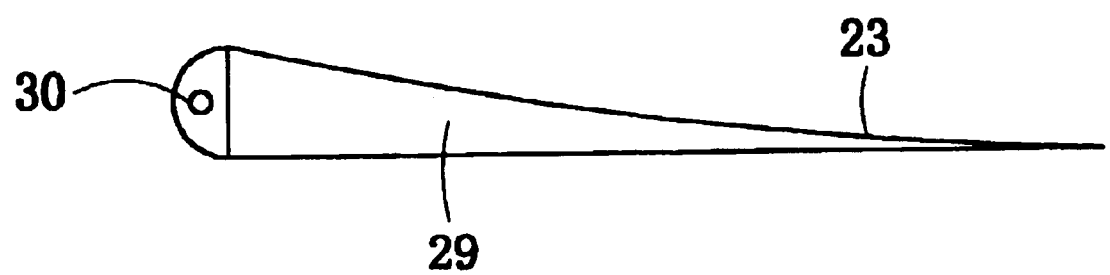
FIG. 28 is a side view for indicating a forward lightening apparatus, according to a further mode, employed in the reflection type display apparatus of the first embodiment.

Alternatively, as shown in FIG. 28, the surface of the light conducting plate 29 may be formed by a curved plane. Since the surface of the light conducting plate 29 is formed as a proper curved plane, fluctuations of luminance within the plane may be decreased. In FIG. 28, although the surface of the light conducting plate 29 is formed by the concave plane, this surface may be made by a convex plane, or may be alternatively mode by such a curved plane which is formed by combining the concave plane with the convex plane. Although not shown in this drawing, the above-described curved plane may be made by a spherical plane, an elliptical plane, a conical plane, or such a plane which is obtained by rotating a curved line of a quadric equation, or a curved line of a logarithm.

Figure 29:
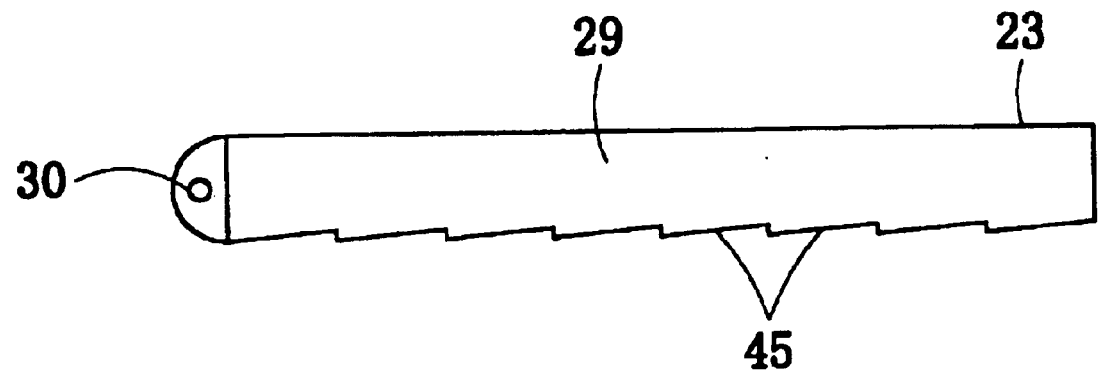
FIG. 29 is a side view for indicating a forward lightening apparatus, according to a further mode, employed in the reflection type display apparatus of the first embodiment.
Figure 30:
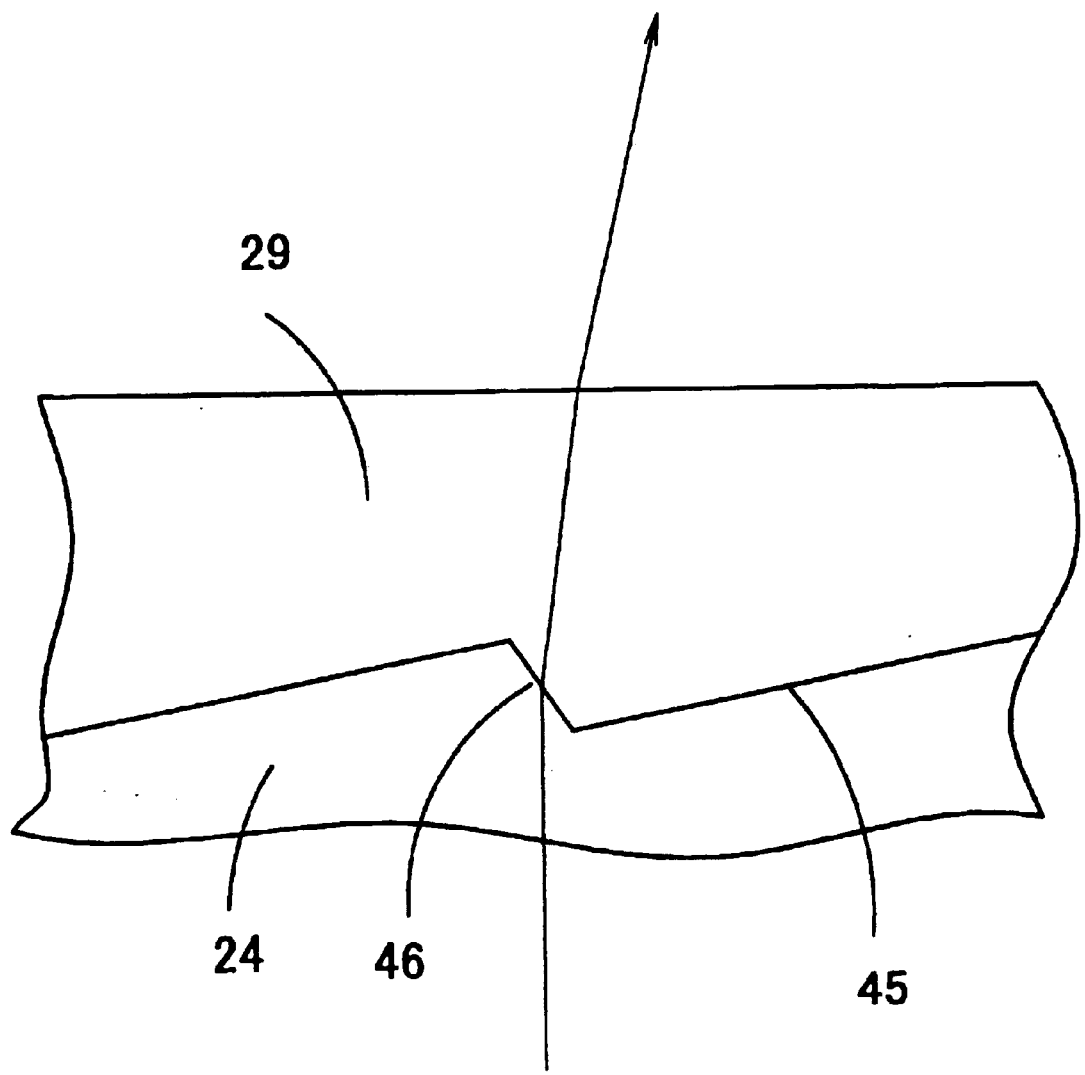
FIG. 30 is an explanatory diagram for explaining operations of the forward lightening apparatus of FIG. 29.

As illustrated in FIG. 29, a sawtooth-shaped pattern 45 may be formed on the rear surface of the light conducting plate 29. Even when such a modified light conducting plate 29 is employed, while a projection direction of light which is projected from the rear surface is inclined, contrast of the display screen may be improved. Also, since the sawtooth-shaped pattern 45 is formed on the rear surface of the light conducting plate 29, the light reflected on the reflection plane 26 is diffused at such a region whose gradient is sharp. However, as shown in FIG. 30, since the rear surface of the light conducting plate 29 is made in contact with the adhesive layer 24, a difference in the refractive indexes at this rear surface is smaller than that of such a case that this rear surface is made in contact with the air layer. Thus, the light is not largely bent even in the region 46 whose gradient is sharp, and the diffusion characteristic of this region 46 is largely lowered. As a consequence, when the difference in the refractive indexes of the light conducting plate 29 and the adhesive layer 24 is set to a small value, the transparent characteristic of the reflection type display apparatus 21 can be hardly lowered, as compared with such a case that the pattern is provided on the front surface of the light conducting plate 29.

Figure 31A:
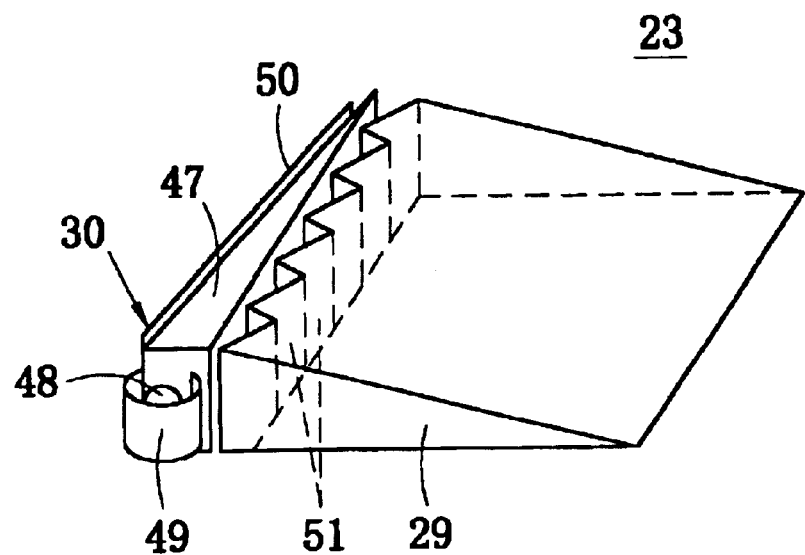
FIG. 31A and FIG. 31B are a perspective view and a plan view, which show a forward lightening apparatus, according to a still further mode, employed in the reflection type display apparatus of the first embodiment.
Figure 31B:
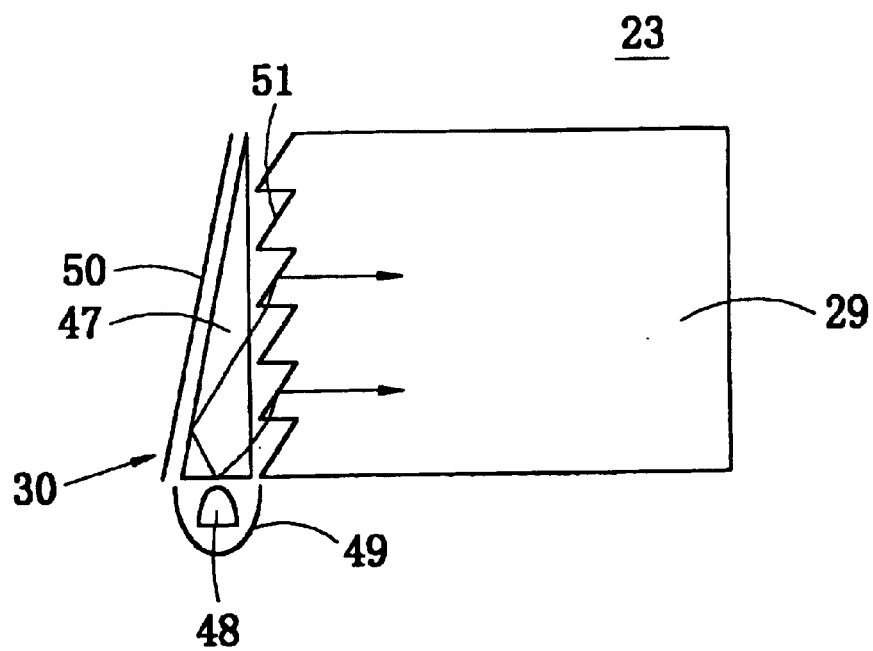

Also, FIG. 31A and FIG. 31B are both a perspective view and a plane view, which illustratively show a forward lightening apparatus 23 having a further different structure. This forward lightening apparatus 23 employs such a light source unit 30 for converting a point light source into a line-shaped light source. That is to say, while a light emitting element 48 such as an LED (namely, point light source) is located opposite to an edge surface of a transparent light conducting member 47 having a wedge shape, a peripheral area of the light emitting element 48 is covered by a shade 49, and also, a reflection sheet 50 is provided on the rear surface of the light conducting member 47. A prism-shaped light conducting direction converting pattern 51 is formed on an edge of the light conducting plate 29, which is located opposite to the light source unit 30.

As a result, in this forward lightening apparatus 23, as represented in FIG. 31B, light emitted from the light emitting element 48 is conducted from the edge surface of the light conducting member 47 into this light conducting member 47, and then, this entered light is propagated through this light conducting member 47 while this entered light is totally reflected between the front surface and the rear surface of the light conducting member 47. Among the light propagated through the light conducting member 47, such light is obliquely projected from the surface of the light conducting member 47. This projected light is entered into the surface of the light conducting member 47 at an angle smaller than the critical angle of the total reflection. It should also be noted that the light projected from the rear surface of the light conducting member 47 is reflected on the reflection sheet 50 and thereafter the reflected light is again returned to the inside of the light conducting member 47. Thus, the light emitted from the light emitting element 48 is projected from the surface of the light conducting member 47 along the oblique direction over the entire length thereof. Then, the light which is obliquely projected from the light source unit 30 is entered from the light conducting direction converting pattern 51 into the inside of the light conducting plate 29. At this time, the propagation direction of this light is refracted by the light conducting direction converting pattern 51, and thus, the light may be conducted in parallel to the edge of the light conducting plate 29 inside the light conducting plate 29.

Second Embodiment Mode

Figure 32A:
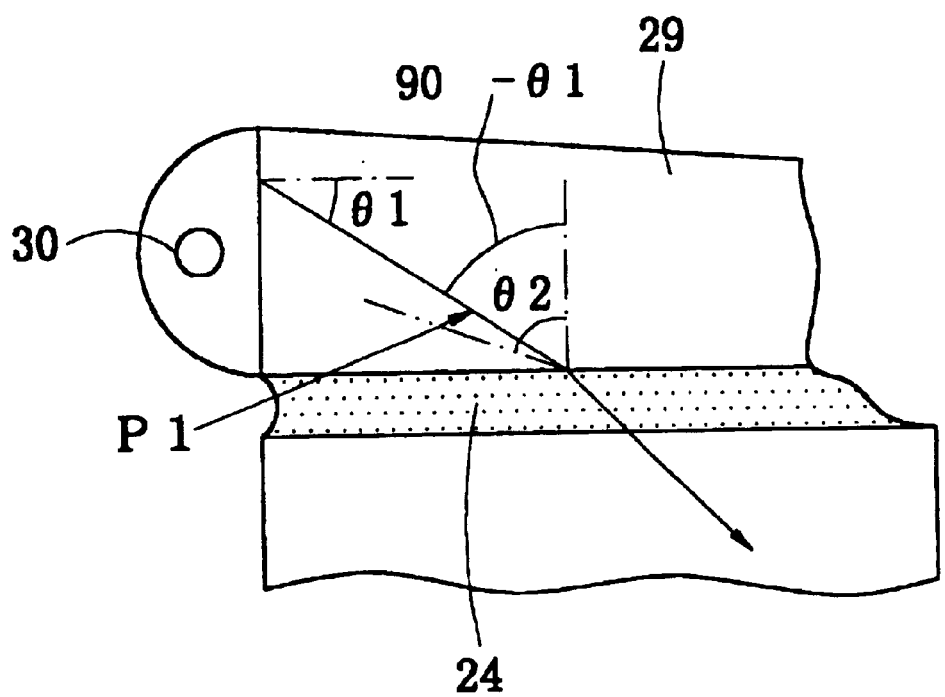
FIG. 32A is an explanatory diagram for explaining a leak of light occurred in the vicinity of the light source unit.

As explained in the first embodiment mode, in the case that the entire rear surface of the light conducting plate 29 is adhered to the reflection type display panel 22 by using the adhesive layer 24, since the refractive index of the adhesive layer 24 is larger than the refractive index of the air, the critical angle of the total reflection on the rear surface of the light conducting plate 29 is increased. As a result, there is such a risk that the light may be unnecessarily projected in the vicinity of the light source unit 30. In other words, assuming now that the critical angle of the total reflection on the boundary plane between the light source unit 30 and air is equal to "$\theta_1$" and the critical angle of the total reflection between the light conducting plate 29 and the adhesive layer 24 is equal to "$\theta_2$ ($>\theta_1$)", as shown in FIG. 32A, an expansion of such light which is entered from the side surface of the light conducting plate 29 into the inside of this light conducting plate 29 becomes "$\pm\theta_1$." Then, the light entered into the light conducting plate 29 is entered into the rear surface of the light conducting plate 29 at such an incident angle larger than "90 degrees$-\theta_1$." As a result, when the below-mentioned formula (1) is satisfied, a leak of light will occur:

$$\theta_2 > 90° - \theta_1$$

namely, $\theta_1 + \theta_2 > 90°$ \hfill (1).

Figure 32B:
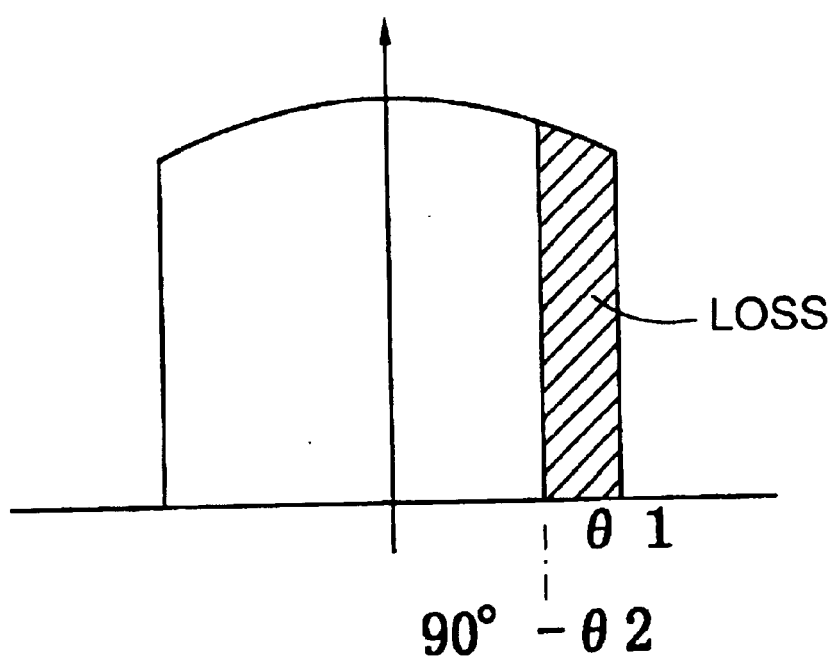
FIG. 32B is a diagram for representing a light conducting angle distribution at a point "P1"

Therefore, in the case that the above-described formula (1) is satisfied, a leak of light will occur in the vicinity of the light source unit 30. In other words, light of a hatched region shown in FIG. 32B may leak to become loss. In such a case that large lose of the light derived from the light source unit 30 is produced, and the light conducting plate 29 becomes bright in the vicinity of the light source unit 30.

Figure 33A:
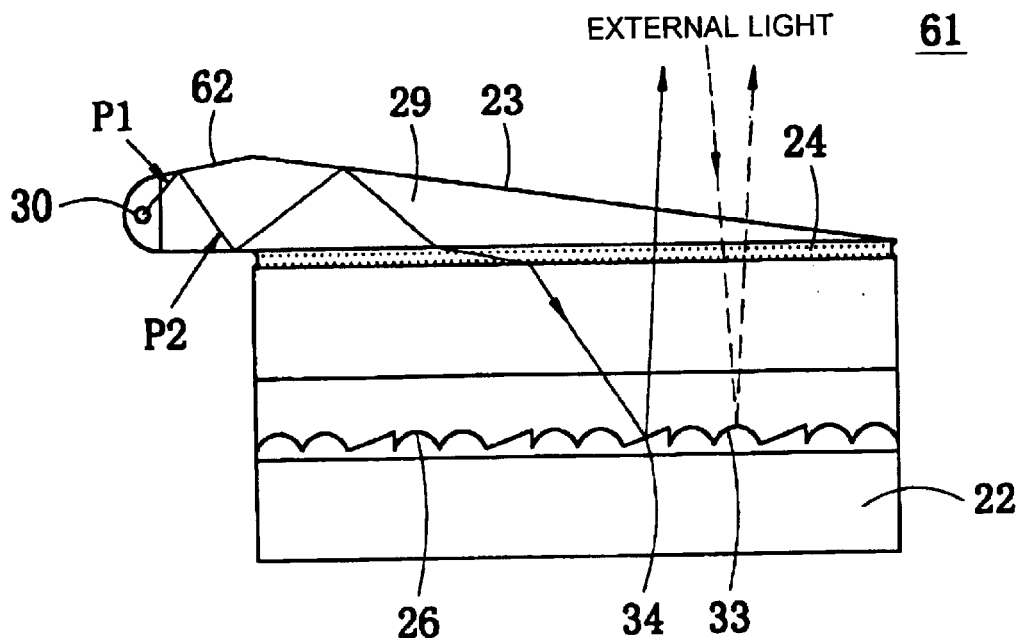
FIG. 33A is a sectional view for representing a structure of a reflection type display apparatus according to a second embodiment mode of the present invention.
Figure 33B:
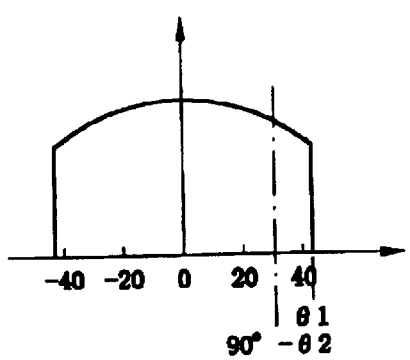
FIG. 33B and FIG. 33C are diagrams for representing light conducting angle distributions at both a point P2 and a point P3.
Figure 33C:
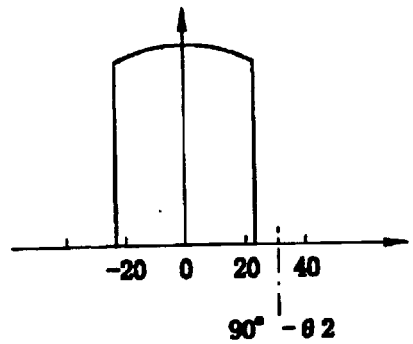

FIG. 33A is a sectional view for schematically indicating another reflection type display apparatus 61 according to a second embodiment mode of the present invention. This second reflection type display apparatus 61 may reduce a leak of light in the vicinity of the light source unit 30. In this reflection type display apparatus 61, while a region 62 located adjacent to the light source unit 30 of the light conducting plate 29 is arranged at the outer side from the adhesive larger 24 so as to be contacted to the air layer, the critical angle "$\theta_2$" of the total reflection may be increased and the leak of light may be reduced. Furthermore, in the region 62 located adjacent to the light source unit 30, the light conducting plate 29 is tapered in such a manner that the thickness of the light conducting plate 29 is gradually made thicker, while the position of the light conducting plate 29 is separated far from the light source unit 30. As a result, as shown in FIG. 33B, at a point "P2", a distribution of light which is outwardly extended from the critical angle of the total reflection at the boundary plane between the adhesive layer 24 and the light conducting plate 29 is collected to such a range narrower than the critical angle of the total reflection on the boundary plane between the adhesive layer 24 and the light conducting plate 29 at a point "P3" as shown in FIG. 33C after the light has been conducted in the region 62. As a result, even when this light is reached to the boundary plane between the adhesive layer 24 and the light conducting plate 29, the light is not leaked from the boundary plane between the adhesive layer 24 and this light conducting plate 29. Thereafter, since this light is totally-reflected in a repetition manner in a thinner region having the wedge shape of the light conducting plate, the light is gradually projected from the boundary plane between the adhesive layer 24 and the light conducting plate.

Third Embodiment Mode

Figure 34:
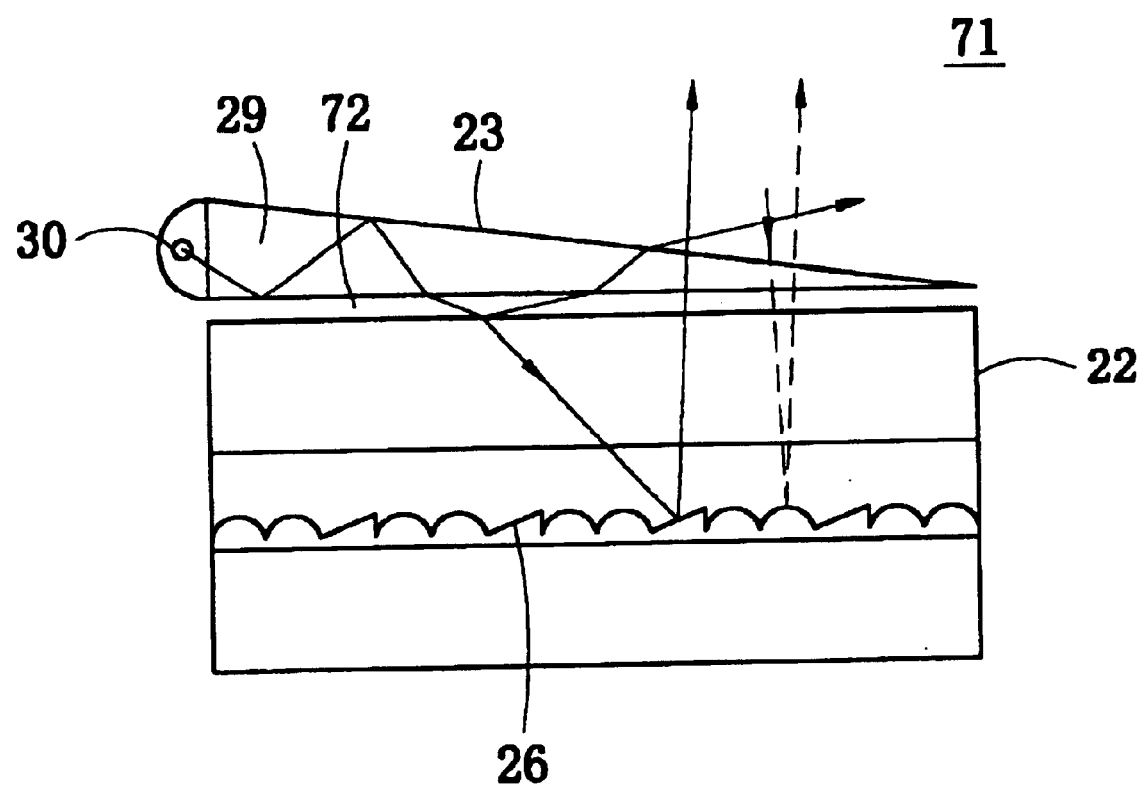
FIG. 34 is a sectional view for schematically indicating a structure of a reflection type display apparatus according to a third embodiment mode of the present invention.

FIG. 34 is a sectional view for schematically showing another reflection type display apparatus 71 according to a further embodiment mode of the present invention. In this third reflection type display apparatus 71, the rear surface of the forward lightening apparatus 23 is not adhered to the reflection type display panel 22, but an air layer 72 is interposed between the rear surface of the forward lightening apparatus 23 and the reflection type display panel 22. In such a reflection type display apparatus 71 of the third embodiment, there is such a risk that a utilization efficiency of light is lowered, as compared with that of the first embodiment. However, since the light can be obliquely projected from the rear surface of the forward lightening apparatus 23, an operation effect similar to that of the first embodiment may be achieved, and thus, contrast of the display screen may be increased. Also, when such a light conducting plate 29 having no pattern is employed, since the light is not diffused, the transparent characteristic of the forward lightening apparatus 23 may be made better. Furthermore, since such an adhesive layer is no longer required, cost of this reflection type display apparatus 71 may be lowered. In addition, since there is no such a problem that the adhesive agent is stripped, or the quality of this adhesive agent is deteriorated due to the thermal aspect.

It should be noted that when such a light conducting plate 29 having a pattern shown in FIG. 29 on the rear surface is employed, since no adhesive layer is provided, the light diffusion is increased and thus the transparent characteristic of the forward lightening apparatus is lowered, while the case of employing the light conducting plate 29 as shown in FIG. 29 is compared with the case of the first embodiment. However, even when such an adhesive layer is not present, since the pattern is provided on the rear surface, this pattern can be hardly observed and thus the transparent characteristic can be improved in comparison with such a case that the light conducting plate where the pattern is formed on the front surface thereof is employed.

Fourth Embodiment Mode

Figure 35:
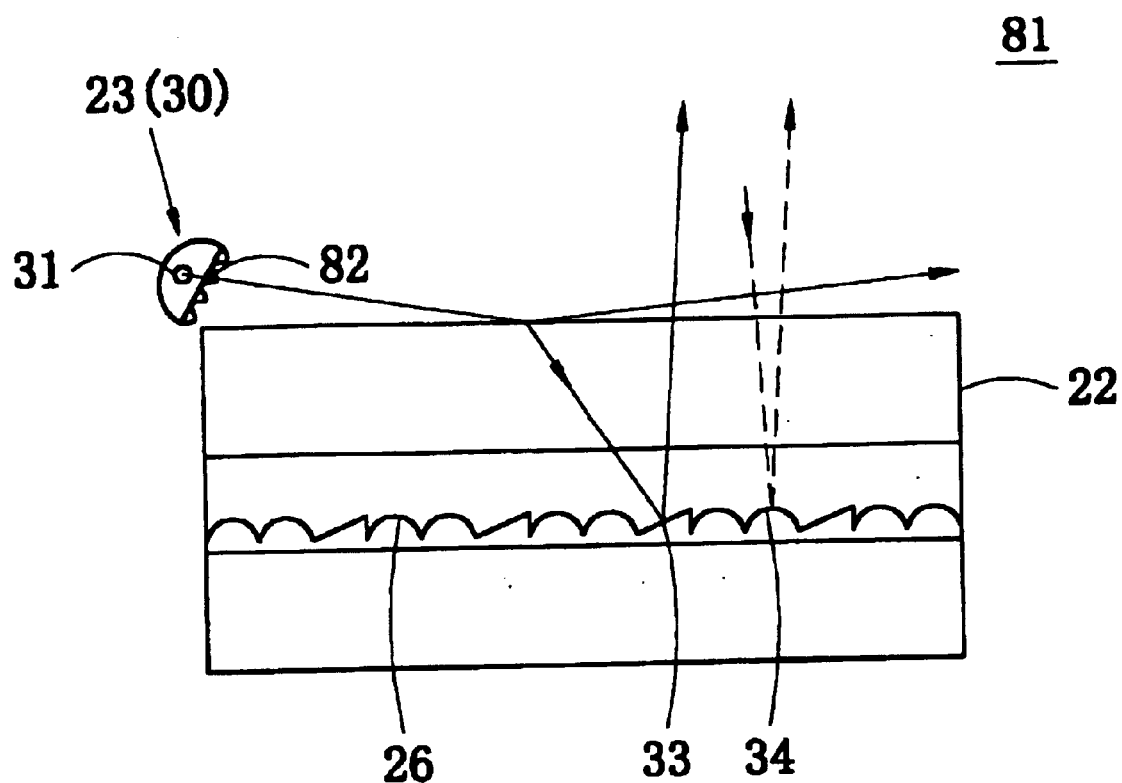
FIG. 35 is a sectional view for schematically indicating a structure of a reflection type display apparatus according to a fourth embodiment mode of the present invention.

FIG. 35 is a sectional view for schematically showing another reflection type display apparatus 81 according to a still further embodiment mode of the present invention. In this fourth reflection type display apparatus 81, while a light conducting plate is not employed, this display apparatus 81 is constituted only by the light source unit 30. That is, light projected from a light source (line-shaped light source) 31 is obliquely projected toward the entire surface of the reflection type display panel 22. At this time, since the light derived from the light source unit 30 must be uniformly irradiated onto the reflection type display panel 22, a prism sheet 82 is installed on a front surface of the light source 31. While the light projected from the light source 31 is refracted by this prism sheet 82 along an oblique downward direction, this light is obliquely projected toward the entire surface of the reflection type display panel 22, and also, the directivity of the light derived from the light source 31 is increased by the prism sheet 82 so as to uniformly irradiate the light. The light which is obliquely projected from the light source 31 (forward lightening apparatus 23) is refracted when this light is entered into the reflection type display panel 22, and then, is obliquely entered into this reflection type display panel 22. Thereafter, this light is reflected on the second pattern 34 to be projected along the forward direction. Also, the external light which is entered from the forward direction is reflected on the first pattern 33, and then, is again projected along the forward direction.

Even in such a reflection type display apparatus 81, since the light is obliquely entered into the reflection type display panel 22, such light (namely, invalid light) which is reflected on the surface of the reflection type display panel 22 is also reflected along the oblique direction, but is not projected along the forward direction. As a consequence, even in the reflection type display apparatus 81 of this fourth embodiment, since there is no optical pattern in front of the reflection type display panel 22, there is no risk that the transparent characteristic of the display screen is lowered.

Electronic Appliance Using Reflection Type Display Apparatus

Figure 36:
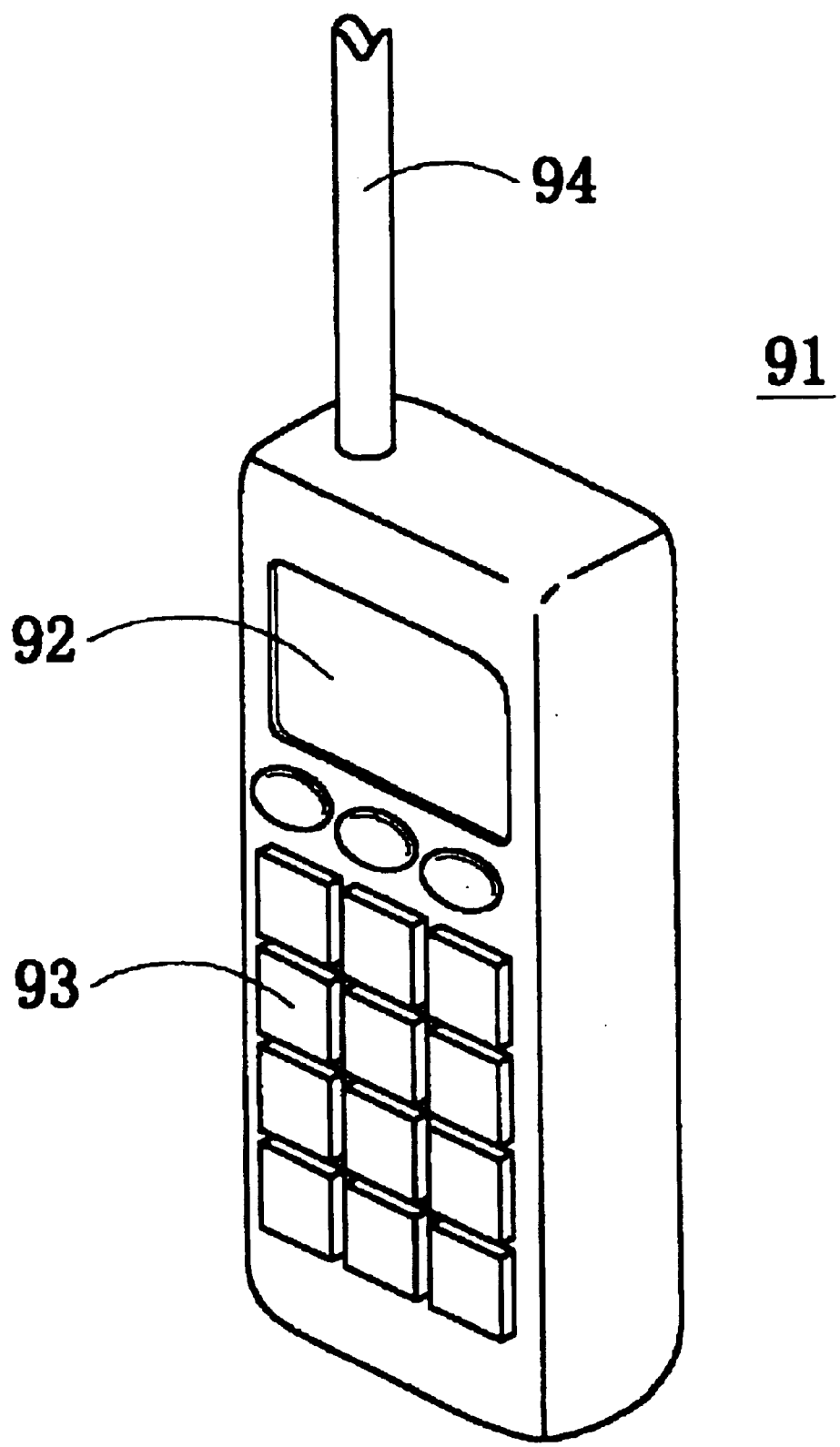
FIG. 36 is a perspective view for showing a portable telephone with employment of the reflection type display apparatus of the present invention.

FIG. 36 illustratively shows a portable telephone 91 according to an embodiment mode of the present invention. This portable telephone 91 is provided with a display unit 92, a dial 93, an antenna 94, and the like. As this display unit 92, the reflection type display apparatus of the present invention is employed, by which such a display unit having a high transparent feelings can be obtained, while contrast thereof can be increased.

Figure 37:
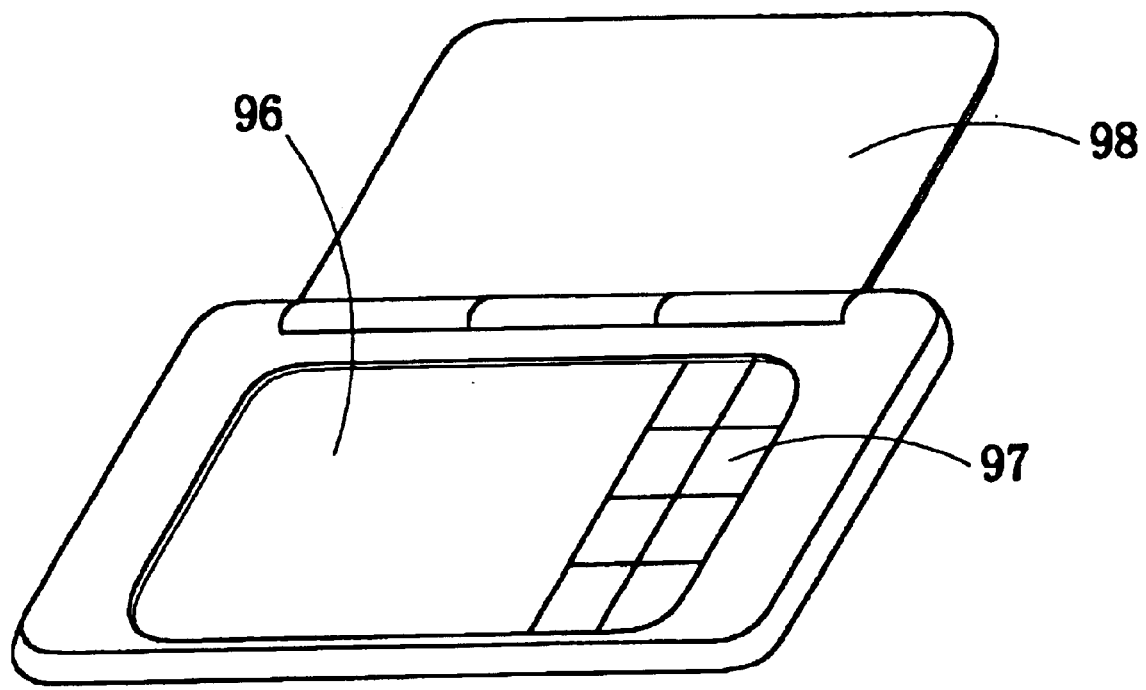
FIG. 37 is a perspective view for indicating a portable information terminal with employment of the reflection type display apparatus of the present invention.

FIG. 37 illustratively represents a portable information terminal 95 according to an embodiment mode of the present invention. The portable information terminal 95 is equipped with a display unit 96, an input unit 97, a cover 98, and the like. As this display unit 96, the reflection type display apparatus of the present invention is employed, by which such a display unit having a high transparent feeling can be obtained, while contrast thereof can be increased.

Figure 38:
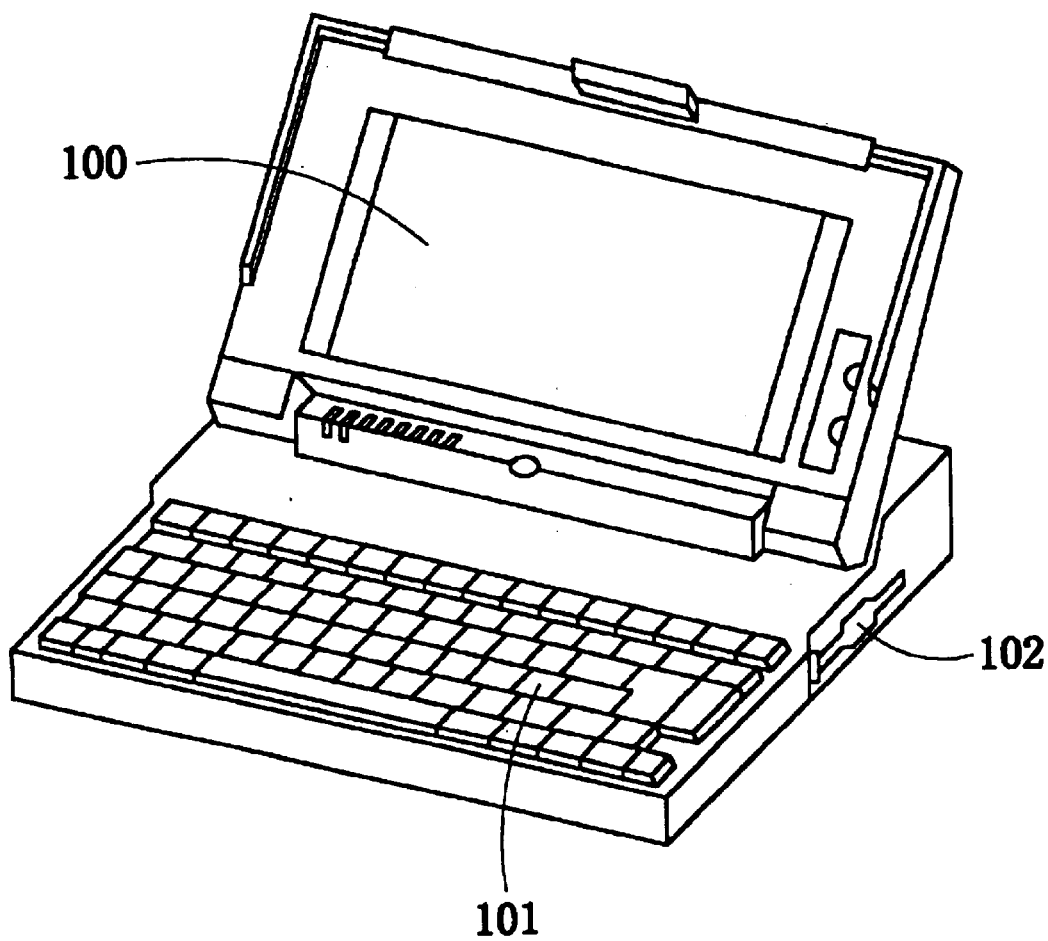
FIG. 38 is a perspective view for showing a portable computer with employment of the reflection type display apparatus of the present invention.

FIG. 38 illustratively represents a portable computer 99 such a notebook personal computer, according to an embodiment mode of the present invention. This portable computer 99 is equipped with a display unit 100, a keyboard 101, a floppy disk drive 102, and the like. As this display unit 100, the reflection type display apparatus of the present invention is employed, by which such a display unit having a high transparent feeling can be obtained, while contrast thereof can be increased.

Figure 39:
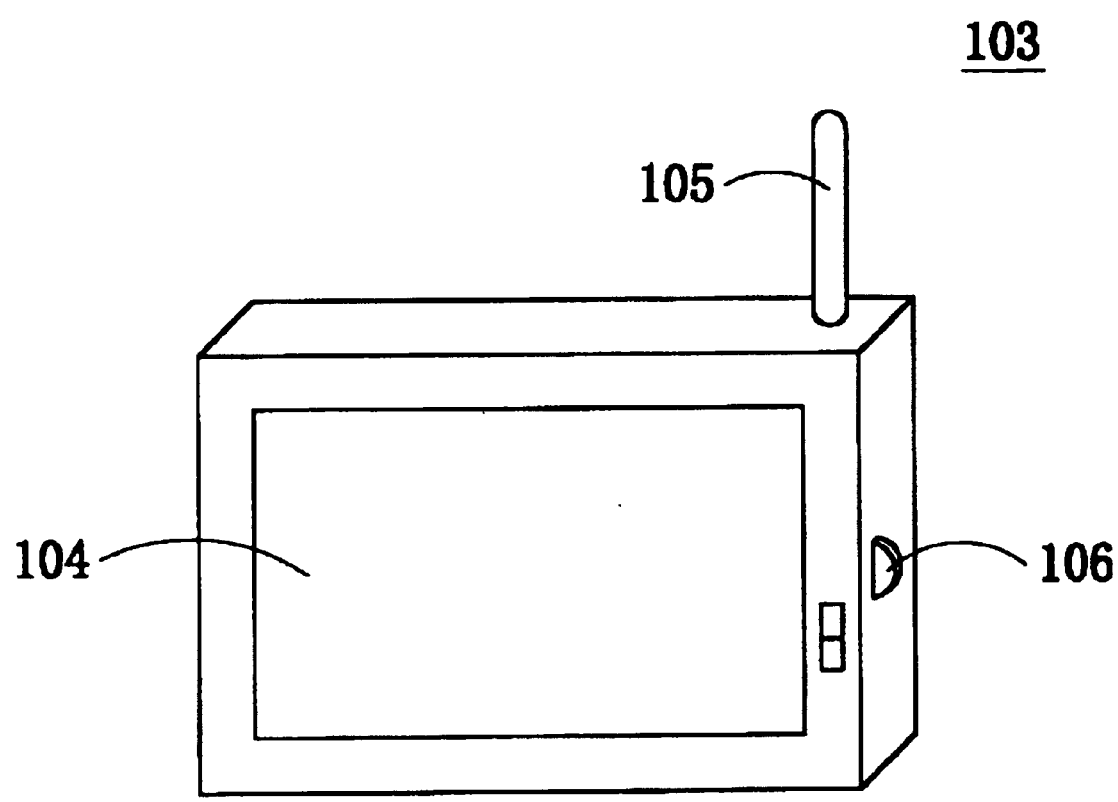
FIG. 39 is a perspective view for indicating a television with employment of the reflection type display apparatus of the present invention.

FIG. 39 illustratively represents a television (receiver) 103 according to an embodiment mode of the present invention. This television 103 is equipped with a display unit 104, an antenna 105, a tuning unit 106, and the like. As this display unit 104, the reflection type display apparatus of the present invention is employed, by which such a display unit having a high transparent feeling can be obtained, while contrast thereof can be increased.

In accordance with the reflection type display apparatus of the present invention, both the light derived from the forward lightening apparatus, which is reflected on the reflection plane, and the external light which is reflected on the reflection plane are projected along the substantially same reflection directions. As a result, there is no change in the directions along which the display screen can be observed when the display screen is illuminated by employing the forward lightening apparatus and also when the display screen is illuminated by the external light without employing the forward lightening apparatus. Thus, easy operations of this reflection type display apparatus can be maintained. Moreover, in this reflection type display apparatus, since the light which is entered from the forward lightening apparatus into the reflection type display panel is entered into this reflection type display panel from such a direction different from the direction along which the external light is entered into the reflection type display panel, even when the light projected from the forward lightening apparatus is reflected on the surfaces, or the internal portions of the forward lightening apparatus and the reflection type display panel to become such invalid light which never contributes the display operation, this invalid light is not reflected along the same direction as that of the reflection light for the display purpose. As a consequence, in accordance with the reflection type display apparatus of the present invention, it is possible to avoid such a phenomenon that the contrast of the display screen is lowered by the reflection light of the forward lightening apparatus, so that the display screen can be easily observed.

What is claimed is:

1. A reflection type display apparatus comprising:
   a reflection type display panel having a reflection plane used to reflect thereon light entered from a forward direction; and
   a forward lightening apparatus arranged in front of said reflection type display panel; wherein:
   light which is entered from said forward lightening apparatus into said reflection type display panel is entered into said reflection type display panel along a direction different from a direction of external light entered into said reflection type display panel;

both the light which is derived from said forward lightening apparatus and is reflected on said reflection plane, and said external light which is reflected on said reflection plane are projected along the substantially same reflection direction; and said reflection plane is subdivided into both a first region capable of reflecting thereon light which is obliquely entered from said forward lightening apparatus along said reflection direction, and a second region capable of reflecting thereon external light which is entered at a substantially right angle along said reflection direction, wherein the first region accounts for a smaller portion of the reflection plane than the second region.

2. A reflection type display apparatus as claimed in claim 1 wherein:

said reflection plane is comprised of:

a first region on which a concave/convex pattern is formed, said concave/convex pattern reflecting thereon light which is obliquely entered from said forward lightening apparatus along said reflection direction; and a second region on which another concave/convex pattern is formed, said concave/convex pattern reflecting thereon external light which is entered at a substantially right angle along said reflection direction.

3. A reflection type display apparatus as claimed in claim 1 wherein:

said reflection plane owns substantially no such a region located in parallel to a front surface of said reflection type display panel.

4. A reflection type display apparatus as claimed in claim 2 wherein:

a normal line stood on an averaged inclined plane of said concave/convex pattern formed on said first region is inclined from a direction perpendicular to the reflection plane toward a light source direction of said forward lightening apparatus.

5. A reflection type display apparatus as claimed in claim 1 wherein:

both a luminance center of light which is derived from said forward lightening apparatus and is reflected on said reflection plane, and another luminance center of external light which is reflected on said reflection plane are collected at a predetermined position in front of said reflection type display panel.

6. A reflection type display apparatus as claimed in claim 1 wherein:

said forward lightening apparatus is comprised of: a light source for projecting light; and a light conducting plate for confirming incident light in the own light conducting plate and for propagating said confined light through the own light conducting plate.

7. A reflection type display apparatus as claimed in claim 1 wherein:

said forward lightening apparatus is comprised of: a light source for projecting light; and a directivity controlling unit for controlling directivity of light projected from said light source.

8. A reflection type display apparatus as claimed in claim 6 wherein:

a thickness of an edge portion of said light conducting plate, which is located far from said light source, is made thinner than a thickness of a portion of said light conducting plate, which is located in the vicinity of said light source.

9. A reflection type display apparatus as claimed in claim 8 wherein:

both a front surface and a rear surface of said light conducting plate are formed under smooth condition.

10. A reflection type display apparatus as claimed in claim 6 wherein:

a front surface of said light conducting plate is made smooth; and a pattern inclined in such a manner that a thickness of said light conducting plate on the side located far from said light source becomes thin is repeatedly formed on a rear surface of said light conducting plate.

11. A reflection type display apparatus as claimed in claim 6 wherein:

a rear surface of said light conducting plate is optically adhered to said reflection type display panel; and a low refractive index layer is formed between said light conducting plate and said reflection type display panel, the reflective index of said low refractive index layer being larger than a refractive index of air and smaller than a refractive index of said light conducting plate.

12. A reflection type display apparatus as claimed in claim 11 wherein:

a thickness of said light conducting plate becomes thin in accordance with a position where said light conducting plate reaches close to said light source within a region close to the light source.

13. A method for manufacturing the reflection type display apparatus recited in claim 1, wherein:

ultraviolet hardening type resin is supplied onto a board; and under such a condition that said ultraviolet hardening type resin is sandwiched between a stamper having an inverted pattern of a reflection plane and said board, ultraviolet rays are irradiated to said ultraviolet hardening type resin so as to harden the ultraviolet hardening type resin, and then to transfer the inverted pattern of said stamper to said ultraviolet hardening type resin.

14. A method for manufacturing the reflection type display apparatus recited in claim 1, wherein:

under such a condition that resin supplied onto a board has not yet been hardened, or is softened, said resin is sandwiched between a stamper having an inverted pattern of a reflection plane and said board and then is depressed so as to transfer the inverted pattern of said stamper to said resin.

15. A reflection type display apparatus as claimed in claim 1 wherein:

while liquid crystal is sealed within said reflection type display panel, said liquid crystal display panel produces an image by utilizing a characteristic of said sealed liquid crystal.

16. A portable telephone comprising:

a dial unit for setting a transmission destination; and a display unit with employment of the reflection type display apparatus recited in claim 1.

17. A portable information terminal comprising:

an input unit used to input data, or a command; and a display unit with employment of the reflection type display apparatus recited in claim 1.

18. A portable type computer comprising:

input/output means; and a display unit with employment of the reflection type display apparatus recited in claim 1.

19. A television comprising:

turning means; and a display unit with employment of the reflection type display apparatus recited in claim 1.

20. An electronic appliance comprising:

a display unit with employment of the reflection type display apparatus recited in claim 1; and an electronic circuit connected to said display unit.

21. In a light reflecting method of a reflection type display apparatus equipped with a reflection type display panel having a reflection plane used to reflect thereon light entered from a forward direction, and a forward lightening apparatus arranged in front of said reflection type display panel, said light reflecting method comprising:

a step for entering light which is entered from said forward lightening apparatus into said reflection type display panel into said reflection type display panel along a direction different from a direction of external light entered into said reflection type display panel; and a step for projecting both the light which is derived from said forward lightening apparatus and is reflected on said reflection plane, and said external light which is reflected on said reflection plane along the substantially same reflection direction, wherein said reflection plane is subdivided into both a first region capable of reflecting thereon light which is obliquely entered from said forward lightening apparatus along said reflection direction, and a second region capable of reflecting thereon external light which is entered at a substantially right angle along said reflection direction;

wherein the first region accounts for a smaller portion of the reflection plane than the second region.

\* \* \* \* \*